United States Patent
Hosseini et al.

(10) Patent No.: US 11,765,732 B2
(45) Date of Patent: Sep. 19, 2023

(54) UPLINK CONTROL INFORMATION REPORTING

(71) Applicant: QUALCOMM Incorporated, San Diego, CA (US)

(72) Inventors: Seyedkianoush Hosseini, San Diego, CA (US); Amir Farajidana, Sunnyvale, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/585,171

(22) Filed: Jan. 26, 2022

(65) Prior Publication Data

US 2022/0150888 A1  May 12, 2022

Related U.S. Application Data

(62) Division of application No. 16/269,017, filed on Feb. 6, 2019, now Pat. No. 11,265,852.

(Continued)

(51) Int. Cl.
*H04W 72/04* (2023.01)
*H04W 72/12* (2023.01)
(Continued)

(52) U.S. Cl.
CPC .......... *H04W 72/21* (2023.01); *H04B 7/0632* (2013.01); *H04B 7/0639* (2013.01);
(Continued)

(58) Field of Classification Search
None
See application file for complete search history.

(56) References Cited

U.S. PATENT DOCUMENTS 9,497,747 B2  11/2016  Damnjanovic et al.
9,844,072 B2  12/2017  Chen et al.
(Continued)

FOREIGN PATENT DOCUMENTS

CN  106550480 A  3/2017
EP  2587699 A2  5/2013
(Continued)

OTHER PUBLICATIONS

International Preliminary Report on Patentability—PCT/US2019/017007 The International Bureau of WIPO—Geneva, Switzerland, dated Aug. 20, 2020.
(Continued)

*Primary Examiner* — Steve R Young
(74) *Attorney, Agent, or Firm* — QUALCOMM Incorporated

(57) ABSTRACT

Methods, systems, and devices for wireless communications are described. A user equipment (UE) may be configured to communicate with a base station on different channels or messages with different processing timelines. In order to prevent a collision between processing communications associated with the different length TTIs, the UE may drop one or more communications on corresponding channels with longer processing timelines to receive and/or process the transmission on the channel with a shorter processing timeline. Additionally, the UE may transmit uplink control information (UCI) for the one or more dropped communications, where the UCI may include hybrid access request (HARQ) acknowledgement/negative acknowledgement (ACK/NAK) feedback, channel quality indicator (CQI), precoding matrix indicator (PMI), rank indicator (RI), etc. If a downlink transmission is dropped, the UE may transmit a NAK message. Alternatively, if an uplink transmission is dropped, the UE may transmit at least a portion of the UCI.

22 Claims, 19 Drawing Sheets

Related U.S. Application Data

(60) Provisional application No. 62/628,916, filed on Feb. 9, 2018.

(51) Int. Cl.
| | | |
|---|---|---|
| *H04B 7/06* | (2006.01) | |
| *H04L 1/18* | (2023.01) | |
| *H04L 5/00* | (2006.01) | |
| *H04W 72/21* | (2023.01) | |
| *H04W 72/1268* | (2023.01) | |
| *H04L 1/1812* | (2023.01) | |
| *H04L 1/1829* | (2023.01) | |
| *H04W 72/20* | (2023.01) | |

(52) U.S. Cl.
CPC .......... *H04L 1/1812* (2013.01); *H04L 1/1832* (2013.01); *H04L 1/1861* (2013.01); *H04L 5/0044* (2013.01); *H04L 5/0053* (2013.01); *H04L 5/0062* (2013.01); *H04L 5/0073* (2013.01); *H04W 72/1268* (2013.01); *H04W 72/20* (2023.01)

(56) References Cited

U.S. PATENT DOCUMENTS

| | | | |
|---|---|---|---|
| 10,237,030 B2 | 3/2019 | Azarian et al. | |
| 2013/0250903 A1 | 9/2013 | Ahn et al. | |
| 2014/0016591 A1* | 1/2014 | Kim | H04W 72/27 370/329 |
| 2016/0021653 A1 | 1/2016 | Papasakellariou et al. | |
| 2016/0219607 A1* | 7/2016 | You | H04W 72/12 |
| 2017/0208581 A1 | 7/2017 | Yang et al. | |
| 2018/0014326 A1* | 1/2018 | Wang | H04W 74/0825 |
| 2018/0048498 A1 | 2/2018 | Stern-Berkowitz et al. | |
| 2019/0052414 A1 | 2/2019 | Babaei et al. | |
| 2019/0090218 A1* | 3/2019 | Noh | H04W 72/1215 |
| 2019/0110311 A1* | 4/2019 | Falconetti | H04L 1/1819 |
| 2019/0199477 A1 | 6/2019 | Park et al. | |
| 2019/0215781 A1 | 7/2019 | Jeon et al. | |
| 2019/0223201 A1 | 7/2019 | Lee et al. | |
| 2019/0223204 A1* | 7/2019 | Kim | H04W 72/14 |
| 2019/0254021 A1 | 8/2019 | Hosseini et al. | |
| 2019/0394773 A1* | 12/2019 | Gao | H04W 72/0446 |
| 2020/0045721 A1* | 2/2020 | Lunttila | H04L 1/00 |

FOREIGN PATENT DOCUMENTS

| | | |
|---|---|---|
| KR | 20170117135 A | 10/2017 |
| WO | WO-2013192601 | 12/2013 |
| WO | WO-2016048593 | 3/2016 |
| WO | WO-2016073081 A1 | 5/2016 |
| WO | WO-2016119160 A1 | 8/2016 |
| WO | WO-2017053637 A1 | 3/2017 |
| WO | WO-2017196250 A1 | 11/2017 |
| WO | WO2018018776 A1 | 2/2018 |

OTHER PUBLICATIONS

International Search Report and Written Opinion—PCT/US2019/017007—ISA/EPO—dated Sep. 9, 2019.
Partial International Search Report—PCT/US2019/017007—ISA/EPO—dated May 16, 2019.
Qualcomm Incorporated: "1ms TTI and sTTI Collision in the Uplink", 3GPP TSG RAN WG1 #88b, R1-1704985, Apr. 3-7, 2017, Spokane, USA, pp. 1-3.

* cited by examiner

UPLINK CONTROL INFORMATION REPORTING

CROSS REFERENCES

The present Application for Patent is a Divisional of U.S. patent application Ser. No. 16/269,017 by HOSSEINI et al., entitled "UPLINK CONTROL INFORMATION REPORTING IN CASE OF TRANSMISSION TIME INTERVAL (TTI) AND SHORTENED TTI COLLISION IN EXCLUSION WINDOW," filed Feb. 6, 2019, which claims the benefit of U.S. Provisional Patent Application No. 62/628,916 by HOSSEINI et al., entitled "UPLINK CONTROL INFORMATION REPORTING IN CASE OF TRANSMISSION TIME INTERVAL (TTI) AND SHORTENED TTI COLLISION IN EXCLUSION WINDOW," filed Feb. 9, 2018, assigned to the assignee hereof, and expressly incorporated by reference herein.

INTRODUCTION

The following relates generally to wireless communication, and more specifically to uplink control information (UCI) reporting.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, a base station and a UE may communicate on one or more subframes that include different processing and response intervals. For example, the one or more subframes may include and be referred to as transmission time intervals (TTIs) that include a first processing and response interval, as well as scheduling units shorter than a subframe, which may be referred to as shortened TTIs (sTTIs), that include a second processing and response interval that is shorter than the TTIs. Additionally or alternatively, the one or more subframes may include transmissions for a first radio access technology (RAT) with a first processing and response interval, as well as transmissions for a second RAT with a second processing and response interval that is shorter than the first. In some cases, the base station may transmit a first downlink message to the UE at a first time and an additional downlink message at a second time after the first time, where the additional downlink message includes a shorter processing and response interval than the first downlink message. However, due to the shorter turnaround time for processing the additional downlink message, collisions may occur when the UE tries to process the corresponding downlink messages or tries to process uplink messages scheduled by the downlink messages. Efficient techniques for reducing the impact of such collisions are desired.

SUMMARY

The described techniques relate to improved methods, systems, devices, and apparatuses that support uplink control information (UCI) reporting. Generally, the described techniques provide for enabling a user equipment (UE) to reduce the impact of processing collisions between different communications associated with different processing and response intervals. In some cases, a UE may receive a first uplink grant (e.g., scheduling a data transmission in a first message). Additionally, the UE may then receive a second uplink grant after receiving the first uplink grant to schedule a second data transmission in a second message. In some cases, the interval between the second uplink grant and transmission of the second message may be shorter than the interval between the first uplink grant and transmission of the first message (e.g., the second uplink grant and the second message are associated with a faster processing timeline). For example, the second uplink grant may be associated with a transmission time interval (TTI) that is shorter than a TTI for the first uplink grant (e.g., the TTI for the second uplink grant may be referred to as a shortened TTI (sTTI)), where the shorter TTI for the second uplink grant also corresponds to a shorter processing and response interval than the TTI for the first uplink grant. Accordingly, a collision may occur if the UE attempts to process both the first uplink grant and the second uplink grant at the same time based on their respective processing intervals. In some cases, the UE may determine to not process the received first uplink grant (e.g., or prepare an uplink message in response to the first uplink grant) based on the different processing intervals colliding. However, the first uplink grant may include an indication for the corresponding first message scheduled by the first uplink grant to carry acknowledgement feedback (e.g., first data in the first message). As such, the UE may determine that the first message is scheduled to carry UCI and may then transmit a portion of the UCI in the first message without including the first data in the first message.

Additionally or alternatively, a UE may receive one or more first data messages with a first feedback interval. In some cases, the UE may subsequently receive a second data message having a second feedback interval, where the second feedback interval may be shorter than the first feedback interval (e.g., the second feedback interval is associated with a faster processing timeline). Additionally, in some cases, a TTI associated with the second data message may be shorter than a TTI associated with the one or more first data messages. In some cases, the UE may then determine whether a collision exists between processing the first data messages and processing the second data message. The UE may then use this determination to further determine whether to process one or more of the first data messages within an exclusion window associated with the second message (e.g., a number of slots preceding the second message).

A method for wireless communication is described. The method may include receiving one or more first data messages, each of the one or more first data messages having a first feedback interval; receiving, after receipt of the one or more first data messages, a second data message having a second feedback interval, where the second feedback interval is shorter than the first feedback interval; determining, for each of the one or more first data messages within an exclusion window of the second data message, whether a collision exists between processing of the one or more first data messages and processing of the second data message; formatting the first data message in accordance with the first data message being scheduled to carry UCI and the first data; and determining whether to process individual ones of the one or more first data messages in the exclusion window based on whether corresponding collisions were determined.

An apparatus for wireless communication is described. The apparatus may include means for receiving one or more first data messages, each of the one or more first data messages having a first feedback interval; means for receiving, after receipt of the one or more first data messages, a second data message having a second feedback interval, where the second feedback interval is shorter than the first feedback interval; means for determining, for each of the one or more first data messages within an exclusion window of the second data message, whether a collision exists between processing of the one or more first data messages and processing of the second data message; means for formatting the first data message in accordance with the first data message being scheduled to carry UCI and the first data; and means for determining whether to process individual ones of the one or more first data messages in the exclusion window based on whether corresponding collisions were determined.

An apparatus for wireless communication is described. The apparatus may include a processor, memory in electronic communication with the processor, and instructions stored in the memory and executable by the processor to cause the processor to receive one or more first data messages, each of the one or more first data messages having a first feedback interval; receive, after receipt of the one or more first data messages, a second data message having a second feedback interval, where the second feedback interval is shorter than the first feedback interval; determine, for each of the one or more first data messages within an exclusion window of the second data message, whether a collision exists between processing of the one or more first data messages and processing of the second data message; format the first data message in accordance with the first data message being scheduled to carry UCI and the first data; and determine whether to process individual ones of the one or more first data messages in the exclusion window based on whether corresponding collisions were determined.

A non-transitory computer-readable medium for wireless communication is described. The non-transitory computer-readable medium may include instructions operable to cause a processor to receive one or more first data messages, each of the one or more first data messages having a first feedback interval; receive, after receipt of the one or more first data messages, a second data message having a second feedback interval, where the second feedback interval is shorter than the first feedback interval; determine, for each of the one or more first data messages within an exclusion window of the second data message, whether a collision exists between processing of the one or more first data messages and processing of the second data message; format the first data message in accordance with the first data message being scheduled to carry UCI and the first data; and determine whether to process individual ones of the one or more first data messages in the exclusion window based on whether corresponding collisions were determined.

Some examples of the method, apparatus, and non-transitory computer-readable medium described above may further include processes, features, means, or instructions for refraining from processing at least one of the one or more first data messages in the exclusion window based on an existence of a collision with processing of the second data message, where the at least one of the one or more first data messages comprises an indication to transmit hybrid access request (HARQ) acknowledgment (ACK) feedback for the corresponding first data message; and transmitting a negative acknowledgment (NAK) to a base station that transmitted the at least one of the one or more first data messages based on the indication to transmit the HARQ ACK feedback. In some examples of the method, apparatus, and non-transitory computer-readable medium described above, transmitting the NAK may include transmitting the NAK during a subframe in which the HARQ ACK feedback for the at least one of the one or more first data messages is scheduled to be transmitted.

Some examples of the method, apparatus, and non-transitory computer-readable medium described above may further include processes, features, means, or instructions for processing at least one of the one or more first data messages in the exclusion window based on an absence of a collision with processing of the second data message and transmitting HARQ feedback to a base station that transmitted the at least one of the one or more first data messages. In some examples of the method, apparatus, and non-transitory computer-readable medium described above, the second data message may have a higher priority than any of the one or more first data messages.

A method for wireless communication is described. The method may include transmitting, to a UE, one or more first data messages, each of the one or more first data messages having a first feedback interval; transmitting, to the UE, a second data message having a second feedback interval such that the one or more first data messages are within an exclusion window of the second data message and such that processing, by the UE, of at least one of the one or more first data messages collides with processing, by the UE, of the second data message, where the second feedback interval is shorter than the first feedback interval; and receiving HARQ feedback for each of the one or more first data messages in the exclusion window despite a collision.

An apparatus for wireless communication is described. The apparatus may include means for transmitting, to a UE, one or more first data messages, each of the one or more first data messages having a first feedback interval; means for transmitting, to the UE, a second data message having a second feedback interval such that the one or more first data messages are within an exclusion window of the second data message and such that processing, by the UE, of at least one of the one or more first data messages collides with processing, by the UE, of the second data message, where the second feedback interval is shorter than the first feedback interval; and means for receiving HARQ feedback for each of the one or more first data messages in the exclusion window despite a collision.

An apparatus for wireless communication is described. The apparatus may include a processor, memory in electronic communication with the processor, and instructions stored in the memory and executable by the processor to cause the processor to transmit, to a UE, one or more first data messages, each of the one or more first data messages having a first feedback interval; transmit, to the UE, a second data message having a second feedback interval such that the one or more first data messages are within an exclusion window of the second data message and such that processing, by the UE, of at least one of the one or more first data messages collides with processing, by the UE, of the second data message, where the second feedback interval is shorter than the first feedback interval; and receive HARQ feedback for each of the one or more first data messages in the exclusion window despite a collision.

A non-transitory computer-readable medium for wireless communication is described. The non-transitory computer-readable medium may include instructions operable to cause a processor to transmit, to a UE, one or more first data messages, each of the one or more first data messages having a first feedback interval; transmit, to the UE, a second data message having a second feedback interval such that the one or more first data messages are within an exclusion window of the second data message and such that processing, by the UE, of at least one of the one or more first data messages collides with processing, by the UE, of the second data message, the second feedback interval is shorter than the first feedback interval; and receive HARQ feedback for each of the one or more first data messages in the exclusion window despite a collision.

In some examples of the method, apparatus, and non-transitory computer-readable medium described above, receiving the HARQ feedback may include receiving a NAK for the at least one of the one or more first data messages that collided with processing of the second data message, where the at least one of the one or more first data messages is not processed by the UE based on the collision. Some examples of the method, apparatus, and non-transitory computer-readable medium described above may further include processes, features, means, or instructions for retransmitting the at least one of the one or more first data messages based on receipt of the NAK. In some examples of the method, apparatus, and non-transitory computer-readable medium described above, the second data message may have a higher priority than any of the one or more first data messages.

A method for wireless communication is described. The method may include receiving a first uplink grant scheduling transmission of first data in a first data message after a first response interval; receiving, after receipt of the first uplink grant, a second uplink grant scheduling transmission of second data in a second data message after a second response interval, where the second response interval is shorter than the first response interval; determining that the first data message is scheduled to carry UCI; and transmitting, based on the first data message being scheduled to carry the UCI, at least a portion of the UCI in the first data message without including the first data in the first data message.

An apparatus for wireless communication is described. The apparatus may include means for receiving a first uplink grant scheduling transmission of first data in a first data message after a first response interval; means for receiving, after receipt of the first uplink grant, a second uplink grant scheduling transmission of second data in a second data message after a second response interval, where the second response interval is shorter than the first response interval; means for determining that the first data message is scheduled to carry UCI; and means for transmitting, based on the first data message being scheduled to carry the UCI, at least a portion of the UCI in the first data message without including the first data in the first data message.

An apparatus for wireless communication is described. The apparatus may include a processor, memory in electronic communication with the processor, and instructions stored in the memory and executable by the processor to cause the processor to receive a first uplink grant scheduling transmission of first data in a first data message after a first response interval; receive, after receipt of the first uplink grant, a second uplink grant scheduling transmission of second data in a second data message after a second response interval, where the second response interval is shorter than the first response interval; determine that the first data message is scheduled to carry UCI; and transmit, based on the first data message being scheduled to carry the UCI, at least a portion of the UCI in the first data message without including the first data in the first data message.

A non-transitory computer-readable medium for wireless communication is described. The non-transitory computer-readable medium may include instructions operable to cause a processor to receive a first uplink grant scheduling transmission of first data in a first data message after a first response interval; receive, after receipt of the first uplink grant, a second uplink grant scheduling transmission of second data in a second data message after a second response interval, where the second response interval is shorter than the first response interval; determine that the first data message is scheduled to carry UCI; and transmit, based on the first data message being scheduled to carry the UCI, at least a portion of the UCI in the first data message without including the first data in the first data message.

Some examples of the method, apparatus, and non-transitory computer-readable medium described above may further include processes, features, means, or instructions for determining that the first uplink grant is within an exclusion window of the second uplink grant, where transmitting the at least the portion of the UCI in the first data message without including the first data in the first data message is based on the first uplink grant being within the exclusion window.

In some examples of the method, apparatus, and non-transitory computer-readable medium described above, transmitting at least the portion of the UCI in the first data message, which may include transmitting the first data message using a format that is based on inclusion of both the first data and the UCI in the first data message.

In some examples of the method, apparatus, and non-transitory computer-readable medium described above, transmitting at least the portion of the UCI in the first data message may include transmitting dummy data in place of the first data in the first data message.

In some examples of the method, apparatus, and non-transitory computer-readable medium described above, the dummy data may be a set of random bits or a fixed pre-defined sequence of bits that indicates an absence of encoded first data. In some examples of the method, apparatus, and non-transitory computer-readable medium described above, the at least the portion of the UCI to be transmitted in the first data message may be limited to HARQ data.

Some examples of the method, apparatus, and non-transitory computer-readable medium described above may further include processes, features, means, or instructions for determining that a number of encoded rank indication (RI) bits in the UCI satisfies an encoded RI threshold, determining that a number of encoded channel quality indicator (CQI) and precoding matrix indicator (PMI) bits in the UCI satisfies an encoded CQI/PMI threshold, and including HARQ data, RI, and CQI/PMI in the at least the portion of the UCI to be transmitted in the first data message.

Some examples of the method, apparatus, and non-transitory computer-readable medium described above may further include processes, features, means, or instructions for determining that a number of encoded RI bits in the UCI does not satisfy an encoded RI threshold or that a number of encoded CQI and PMI bits in the UCI does not satisfy an encoded CQI/PMI threshold and including only HARQ data in the at least the portion of the UCI to be transmitted in the first data message.

In some examples of the method, apparatus, and non-transitory computer-readable medium described above, the second data message may have a higher priority than the first data message.

A method for wireless communication is described. The method may include transmitting a first uplink grant scheduling transmission, by a UE, of first data in a first data message after a first response interval; transmitting, to the UE, a second uplink grant scheduling transmission of second data in a second data message after a second response interval, where the second response interval is shorter than the first response interval; and receiving the first data message with at least a portion of UCI but without the first data.

An apparatus for wireless communication is described. The apparatus may include means for transmitting a first uplink grant scheduling transmission, by a UE, of first data in a first data message after a first response interval; means for transmitting, to the UE, a second uplink grant scheduling transmission of second data in a second data message after a second response interval, where the second response interval is shorter than the first response interval; and means for receiving the first data message with at least a portion of UCI but without the first data.

An apparatus for wireless communication is described. The apparatus may include a processor, memory in electronic communication with the processor, and instructions stored in the memory and executable by the processor to cause the processor to transmit a first uplink grant scheduling transmission, by a UE, of first data in a first data message after a first response interval; transmit, to the UE, a second uplink grant scheduling transmission of second data in a second data message after a second response interval, where the second response interval is shorter than the first response interval; and receive the first data message with at least a portion of UCI but without the first data.

A non-transitory computer-readable medium for wireless communication is described. The non-transitory computer-readable medium may include instructions operable to cause a processor to transmit a first uplink grant scheduling transmission, by a UE, of first data in a first data message after a first response interval; transmit, to the UE, a second uplink grant scheduling transmission of second data in a second data message after a second response interval, where the second response interval is shorter than the first response interval; and receive the first data message with at least a portion of UCI but without the first data.

In some examples of the method, apparatus, and non-transitory computer-readable medium described above, transmitting the second uplink grant may include transmitting the second uplink grant such that the first uplink grant is within an exclusion window of the second uplink grant.

In some examples of the method, apparatus, and non-transitory computer-readable medium described above, receiving the first data message may include receiving the first data message in a format that is based on inclusion of both the first data and the UCI in the first data message.

In some examples of the method, apparatus, and non-transitory computer-readable medium described above, receiving the first data message may include receiving dummy data in place of the first data in the first data message. In some examples of the method, apparatus, and non-transitory computer-readable medium described above, the dummy data may be a set of random bits or a fixed pre-defined sequence of bits that indicates an absence of encoded first data.

In some examples of the method, apparatus, and non-transitory computer-readable medium described above, the at least the portion of the UCI received in the first data message may be limited to HARQ data.

Some examples of the method, apparatus, and non-transitory computer-readable medium described above may further include processes, features, means, or instructions for determining that the first data message includes a cyclic redundancy check (CRC) value and attempting to decode RI data, CQI and PMI data, and HARQ data in the at least the portion of the UCI of the first data message based on a presence of the CRC value.

Some examples of the method, apparatus, and non-transitory computer-readable medium described above may further include processes, features, means, or instructions for determining that the first data message does not include a CRC value and attempting to decode only HARQ data in the at least the portion of the UCI of the first data message based on an absence of the CRC value.

In some examples of the method, apparatus, and non-transitory computer-readable medium described above, the second data message may have a higher priority than the first data message.

DETAILED DESCRIPTION

Figure 1:
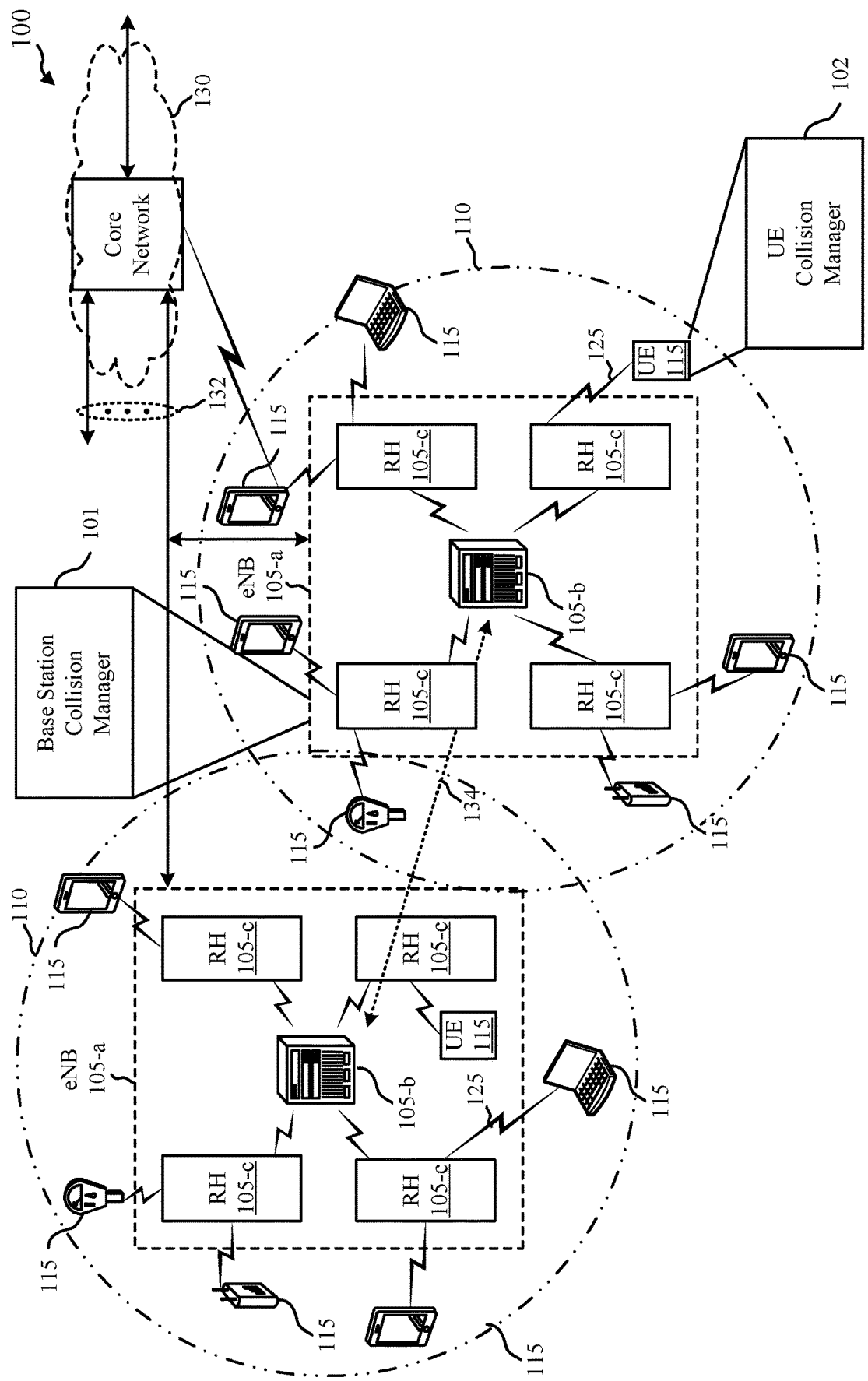
FIG. 1 illustrates an example of a system for wireless communication that supports uplink control information (UCI) reporting in accordance with aspects of the present disclosure.

A user equipment (UE) may be configured to communicate with a base station via channels and messages that have different processing and response intervals. For example, communications between the UE and base station may occur on transmission time intervals (TTIs) and shortened TTIs (sTTIs), where a first transmission may occur on a TTI (e.g., a first channel) with a first processing and response interval and a subsequent transmission may occur on an sTTI (e.g., a second channel) with a second processing and response interval or vice versa. Additionally, the UE may process communications for each channel with the different processing and response intervals, where a processing time for communications on a second channel is shorter than a processing time for communications on a first channel. As such, if a transmission is received in a first subframe with the first processing and response interval and a transmission is received in a second subframe after the first subframe with the second processing and response interval, a collision may occur if the UE attempts to process each transmission at the same time. In order to prevent the collision, the UE may drop one or more communications in corresponding subframes in order to receive and/or process the transmission in the second subframe. However, even though the UE may drop one or more of the communications, the UE may format any corresponding uplink messages to be transmitted in the subframes as if the respective data is sent (e.g., via an uplink control information (UCI) mapping).

In some cases, the UE may receive a physical downlink shared channel (PDSCH) (e.g., a first channel) in one or more subframes before receiving a shortened PDSCH (sPDSCH) (e.g., a second channel) in at least a portion of a subsequent subframe. In order to properly receive and process the sPDSCH, the UE may drop one or more of the PDSCHs located in an exclusion window associated with the sPDSCH (e.g., a window of a number of subframes prior to when the sPDSCH is received). The length of an exclusion window (e.g., the number of subframes preceding the sPDSCH) may be based on UE capability, where the UE capability is reported for each sPDSCH length or processing timeline separately. If a PDSCH is processed, the UE may transmit a hybrid automatic repeat request (HARQ) acknowledgement/negative acknowledgement (ACK/NAK) message in a subsequent subframe with respect to the processed PDSCH based on whether the PDSCH was successfully decoded or not. For example, the UE may transmit the ACK/NAK message at subframe n+k, where n is the subframe in which the PDSCH is received and k is the number of subframes after receiving the PDSCH that the UE is to transmit the HARQ ACK/NAK. Additionally or alternatively, for any PDSCH that is dropped, the UE may transmit a NAK in a subframe subsequent to the dropped PDSCH (e.g., subframe n+k).

In some cases, a UE may receive a physical uplink shared channel (PUSCH) grant (e.g., a first message) in one or more subframes before receiving a shortened PUSCH (sPUSCH) grant or an sPDSCH (e.g., a second message) in at least a portion of a subsequent subframe. Similar to the process described above, the UE may drop one or more PUSCHs and not process the corresponding uplink data associated with one or more of the PUSCH grants located in an exclusion window associated with the sPUSCH grant based on different processing timelines for each of the messages that may cause a collision at the UE. In some cases, a PUSCH associated with one or more of the PUSCH grants may be scheduled to carry UCI (e.g., ACK/NAK, channel quality indicator (CQI), pre-coding matrix indicator (PMI), rank indicator (RI), etc.) that the UE may transmit after processing the corresponding grants. For example, a PDSCH may indicate that ACK/NACK feedback is to be included in the PUSCH. However, when dropping the PUSCHs in order to process the sPUSCH grant or the sPDSCH, the corresponding scheduled UCI may not be transmitted, which may negatively impact downlink operations.

Therefore, the UE may transmit UCI on PUSCH resources specified by the PUSCH grants (e.g., subframe n+k) without processing or preparing uplink data, while formatting the UCI and PUSCH resources as if the uplink data is sent. For example, the UE may transmit the UCI according to specifications (e.g., a number of resources for each UCI component, how and where the UCI components are mapped, modulation order used, power control, etc.) included in an uplink grant (e.g., the PUSCH grant), where the uplink grant assumes the uplink data is to be sent. In some cases, if the uplink data is not sent, the UE may send dummy data (e.g., a set of random bits/modulation symbols or a fixed pre-defined sequence of bits to indicate an absence of the uplink data) to keep phase continuity in the PUSCH. Additionally or alternatively, a base station may indicate that the UE may only need to transmit HARQ ACK/NAK feedback in the UCI. As such, the UE may send dummy or fixed symbols for the uplink data on symbols where the ACK/NAK feedback is mapped (e.g., not on other symbols). In some cases, the UE may transmit a first component of the UCI for the PUSCH grant (e.g., HARQ ACK/NAK feedback) and refrain from transmitting additional components of the UCI (e.g., CQI, PMI, and/or RI). Additionally or alternatively, if a number of coded bits associated with each of the additional components of the UCI satisfy respective thresholds for each component, the UE may transmit the additional components with the first component of the UCI. In some cases, the UE may communicate with one or more base stations according to different radio access technologies (RATs) that each include different processing and response intervals. Accordingly, the UE may use the above described techniques to mitigate any collisions that occur from attempting to process communications for the different RATs at the same time.

Aspects of the disclosure are initially described in the context of a wireless communications system. Additionally, examples of processing timelines, dropping schemes, and process flows are provided to describe aspects of the disclosure. Aspects of the disclosure are further illustrated by and described with reference to apparatus diagrams, system diagrams, and flowcharts that relate to UCI reporting.

FIG. 1 illustrates an example of a wireless communications system 100 in accordance with various aspects of the present disclosure. The wireless communications system 100 includes base stations 105 (e.g., gNodeBs (gNBs), evolved nodeBs (eNBs), radio heads (RH)), UEs 115, and a core network 130. In some examples, the wireless communications system 100 may be an LTE) network, an LTE-A network, an LTE-A Pro network, or an NR network. In some cases, wireless communications system 100 may support enhanced broadband communications, ultra-reliable (e.g., mission critical) communications, low latency communications, or communications with low-cost and low-complexity devices.

The core network 130 may provide user authentication, access authorization, tracking, Internet Protocol (IP) connectivity, and other access, routing, or mobility functions. At least some of the base stations 105, including base station 105-a, which may be an example of an eNB, a network access device, or a gNB, or base station 105-b, which may be an example of an access node controller (ANC), may interface with the core network 130 through backhaul links 132 (e.g., S1, S2, etc.) and may perform radio configuration and scheduling for communication with the UEs 115. In various examples, base stations 105-*b* may communicate, either directly or indirectly (e.g., through core network 130), with each other over backhaul links 134 (e.g., X1, X2, etc.), which may be wired or wireless communication links.

Each base station 105-*b* may also additionally or alternatively communicate with a number of UEs 115 through a number of other base stations 105-*c*, where base station 105-*c* may be an example of a smart radio head (or through a number of smart radio heads). In alternative configurations, various functions of each base station 105 may be distributed across various base stations 105 (e.g., radio heads and access network controllers) or consolidated into a single base station 105 (e.g., a network device).

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like. A UE 115 may be able to communicate with various types of base stations 105-*a*, base stations 105-*c*, access points, smart radio heads, or other network devices, including macro eNBs, small cell eNBs, relay base stations, and the like. A UE 115 may communicate with the core network 130 through communication link 135.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an ANC. Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal the UE 115 received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the Radio Resource Control (RRC) protocol layer may provide establishment, configuration, and maintenance of an RRC connection between a UE 115 and a base station 105-c, base station 105-b, or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a TTI. In other cases, a smallest scheduling unit of the wireless communications system 100 may be shorter than a subframe or may be dynamically selected (e.g., in bursts of sTTIs or in selected component carriers (CCs) using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform-spread-OFDM (DFT-s-OFDM)).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of defined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD CCs.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In addition to being configured for communications via channels or messages with a first processing and response interval (e.g., TTIs, a first RAT, a PDSCH, a PUSCH grant, etc.), a UE 115 may be configured for communications with a base station 105 that include a second processing and response interval shorter than the first processing and response interval (e.g., sTTIs, a second RAT, an sPDSCH, an sPUSCH grant, etc.). For example, a base station 105 may schedule PDSCH (e.g., a first channel) and sPDSCH (e.g., a second channel) transmissions for a UE 115 with a subframe granularity, where a one millisecond PDSCH may be scheduled in one subframe and an sPDSCH may be scheduled within another subframe. As such, the base station 105 may switch between PDSCH and sPDSCH in different subframes. However, the UE 115 may process transmissions corresponding to an sPDSCH faster than processing transmissions corresponding to a PDSCH. The UE 115 may first receive the PDSCH transmission and begin to process the transmission at the same time an sPDSCH is received and the UE 115 initiates processing of the sPDSCH. In some cases, the UE 115 may not be capable of processing and/or decoding both the PDSCH and sPDSCH.

Additionally or alternatively, a base station 105 may schedule PUSCH and sPUSCH transmissions with a UE 115 according to a subframe granularity by transmitting PUSCH and sPUSCH grants to the UE 115. As such, a similar collision may arise for the UE 115 when attempting to process both the PUSCH (e.g., a first message) and sPUSCH (e.g., a second message) grants. For example, once a PUSCH grant is received, the UE 115 may start encoding the uplink signal and preparing the uplink transmission. However, before the PUSCH transmission, the UE 115 may receive an sPUSCH grant, and due to its shorter turn-around processing time, the sPUSCH transmission may be prepared first. As indicated above, the UE 115 may therefore be unable to process both the PUSCH and the sPUSCH transmissions.

In some cases, PUSCHs associated with the PUSCH grants may be scheduled to carry UCI for the UE 115 to transmit (e.g., UCI related to the PUSCH grants or to ACK/NACK feedback associated with PDSCH). For example, the UCI may include HARQ ACK/NAK feedback, CQI/PMI, RI, etc. If the UE 115 is configured for a single serving cell and is not configured for simultaneous PUSCH and physical uplink control channel (PUCCH) transmissions, then in a subframe n, the UE 115 may transmit UCI on PUSCH if the UE 115 is transmitting PUSCH in subframe n. Alternatively, the UE 115 may refrain from transmitting UCI if the PUSCH transmission corresponds to a Random Access Response (RAR) grant or is a retransmission of the same transport block as part of a contention based random access procedure.

Additionally or alternatively, the UE 115 may be configured with more than one serving cell and may not be configured for simultaneous PUSCH and PUCCH transmissions. As such, in subframe n, the UE 115 may transmit the UCI on a primary cell PUSCH if the UCI consists of periodic channel state information (CSI) and/or HARQ ACK and if the UE 115 is transmitting on the primary cell PUSCH in subframe n and the primary cell PUSCH transmission does not corresponds to a RAR frame or a retransmission of the same transport block as part of the contention based random access procedure. Alternatively, the UE 115 may transmit the UCI on a PUSCH of a secondary cell with a smallest index (e.g., SCellIndex) if the UCI consists of periodic CSI and/or HARQ ACK and if the UE 115 is transmitting PUSCH on at least one secondary cell rather than the primary cell.

Wireless communications system 100 may support efficient techniques for mitigating collisions between processing communications that have different processing and response intervals (e.g., TTIs and sTTIs or PDSCH and sPDSCH or PUSCH grants and sPUSCH grants) for a UE 115. For example, the UE 115 may drop one or more communications on corresponding first channels with longer processing and response intervals in order to receive and/or process communications on second channels with shorter processing and response intervals. In some cases, the UE 115 may drop one or more PDSCHs located in an exclusion window prior to an sPDSCH. The length of the exclusion window (e.g., a number of subframes preceding the sPDSCH) may be a capability of the UE 115 and may reported for each channel (e.g., sTTI, sPDSCH, etc.) length or processing timeline separately. If a PDSCH is processed, the UE 115 may transmit a HARQ ACK/NAK message in a subsequent subframe with respect to the processed PDSCH based on whether the PDSCH was successfully decoded or not. For example, the UE 115 may transmit ACK/NAK in subframe n+k, where n is the subframe in which the PDSCH is received and k is the number of subframes after receiving the PDSCH that the UE is to transmit HARQ ACK/NAK. Alternatively, for any PDSCH that is dropped, the UE may transmit a NAK in a subsequent subframe with respect to the dropped PDSCH (e.g., n+k).

Additionally or alternatively, the UE 115 may drop one or more PUSCHs and not process the corresponding uplink data associated with one or more PUSCH grants (e.g., a first message) located in an exclusion window associated with an sPUSCH grant (e.g., a second message). In some cases, a PUSCH associated with one or more of the PUSCH grants may be scheduled to carry UCI that the UE 115 may transmit after processing the corresponding grants as described above. However, when a PUSCH associated with a PUSCH grant is dropped in order to process the sPUSCH grant or an sPDSCH, the corresponding scheduled UCI may not be transmitted, which may negatively impact downlink operations. Therefore, the UE 115 may transmit UCI on PUSCH resources (e.g., subframe n+k) specified by the PUSCH grants in the contention window without processing or preparing uplink data, while formatting the UCI and PUSCH resources as if the uplink data is sent. For example, the UE 115 may transmit the UCI according to specifications included in the PUSCH grant (e.g., a number of resources for each UCI component, how and where UCI components are mapped, modulation order used, power control, etc.), where the PUSCH grant assumes the uplink data is to be sent.

Additionally, if the uplink data is not sent, the UE 115 may send dummy data (e.g., a set of random bits/modulation symbols or a fixed pre-defined sequence of bits to indicate an absence of the uplink data) to keep phase continuity in the PUSCH. Additionally or alternatively, the base station 105 may indicate that the UE 115 may only need to transmit HARQ ACK/NAK feedback in the UCI. In some examples, the UE 115 may send dummy or fixed symbols for the uplink data on symbols where the ACK/NAK feedback is mapped (e.g., not on other symbols). In some cases, the UE 115 may transmit a first component of the UCI in the PUSCH (e.g., HARQ ACK/NAK feedback) and refrain from transmitting additional components of the UCI (e.g., CQI, PMI, and/or RI). Additionally or alternatively, if a number of coded bits associated with each of the additional components of the UCI satisfy respective thresholds for each component, the UE 115 may transmit the additional components with the first component of the UCI.

One or more base stations 105 may include a base station collision manager 101, which may transmit, to a UE 115, one or more first data messages (e.g., PDSCHs) associated with a first processing and response interval (e.g., timeline). Additionally, the base station collision manager 101 may transmit a second data message (e.g., sPDSCH) associated with a second processing and response interval such that the one or more first data messages are within an exclusion window of the second data message and such that processing, by the UE 115, of at least one of the one or more first data messages collides with processing, by the UE 115, of the second data message. In some cases, the base station collision manager 101 may receive HARQ feedback for each one or more first data messages in the exclusion window despite a collision. Additionally or alternatively, the base station collision manager 101 may transmit a first uplink grant (e.g., a first message, a PUSCH grant, etc.) scheduling transmission of first data by a UE 115 in a first data message after a first response interval. Further, the base station collision manager 101 may transmit, to the UE 115, a second uplink grant (e.g., a second message, an sPUSCH grant, etc.) scheduling transmission of second data in a second data message after a second response interval, where the second response interval is shorter than the first response interval. In some examples, the base station collision manager 101 may receive the first data message with at least a portion of UCI but without the first data.

One or more UEs 115 may include a UE collision manager 102, which may receive one or more first data messages (e.g., PDSCHs on a first channel), each of the one or more first data messages having a first feedback interval. Additionally, the UE collision manager 102 may receive, after receipt of the one or more first data messages, a second data message (e.g., sPDSCH on a second channel) having a second feedback interval, where the second feedback interval is shorter than the first feedback interval. In some cases, the UE collision manager 102 may determine, for each of the one or more first data messages within an exclusion window of the second data message, whether a collision exists between processing of the one or more first data messages and processing of the second data message. As such, the UE collision manager 102 may further determine whether to process individual ones of the one or more first data messages in the exclusion window based on whether corresponding collisions were determined. Additionally or alternatively, the UE collision manager 102 may receive a first uplink grant (e.g., a first message, a PUSCH grant, etc.) scheduling transmission of first data in a first data message after a first response interval. Further, the UE collision manager 102 may receive, after receipt of the first uplink grant, a second uplink grant (e.g., a second message, an sPUSCH grant, etc.) scheduling transmission of second data in a second data message after a second response interval, where the second response interval is shorter than the first response interval. In some cases, the UE collision manager 102 may determine that the first data message is scheduled to carry UCI. As such, the UE collision manager 102 may format the first data message in accordance with the first data message being scheduled to carry UCI and the first data and then transmit, based on the first data message being scheduled to carry the UCI, a portion of the UCI in the first data message without including the first data in the first data message.

Figure 2:
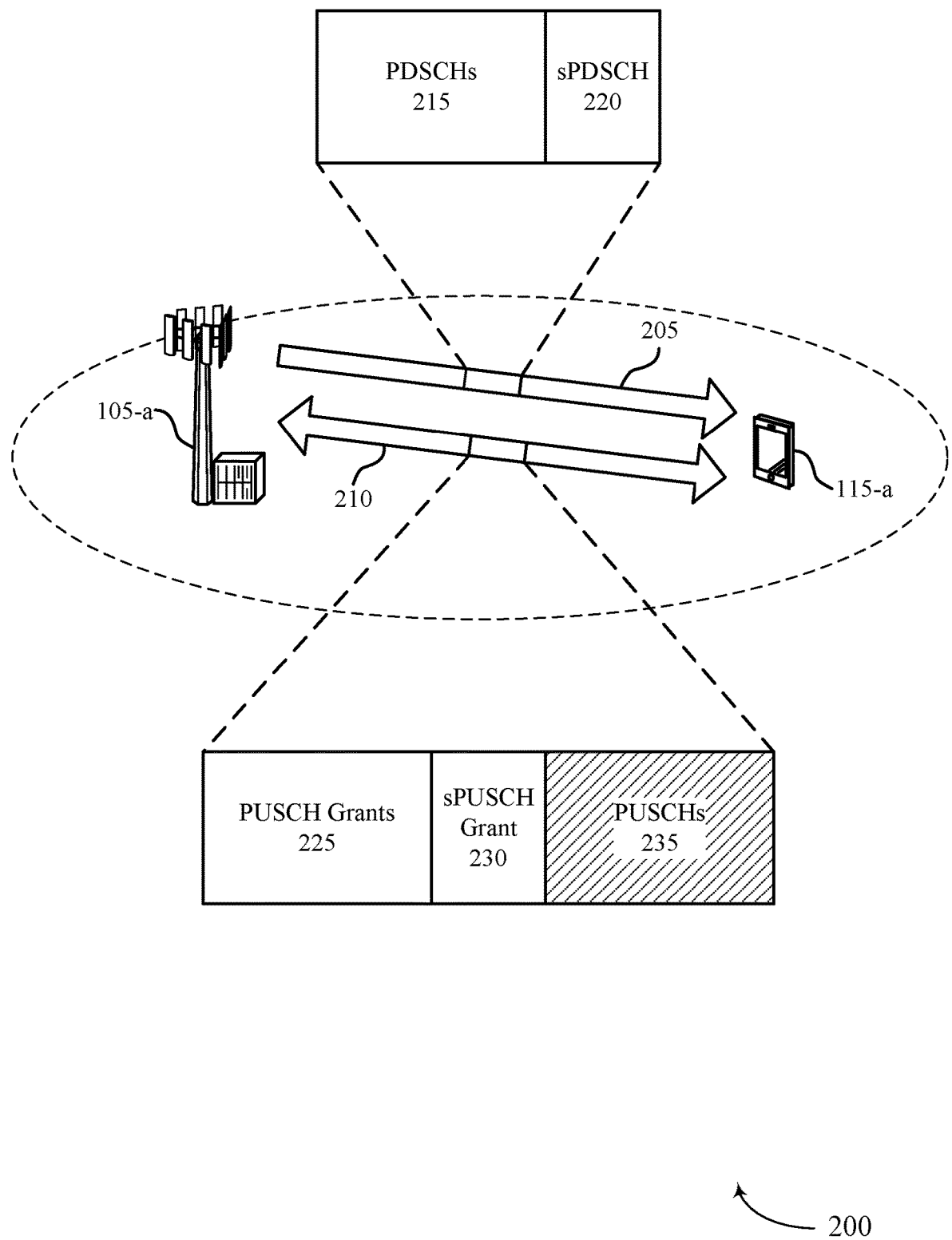
FIG. 2 illustrates an example of a wireless communications system that supports UCI reporting in accordance with aspects of the present disclosure.

FIG. 2 illustrates an example of a wireless communications system 200 that supports UCI reporting in accordance with various aspects of the present disclosure. In some examples, wireless communications system 200 may implement aspects of wireless communications system 100. Wireless communications system 200 may include a base station 105-a and a UE 115-a, which may be examples of base stations 105 and UEs 115 described with reference to FIG. 1. UE 115-a may be configured for communications with a first processing and response interval (e.g., first channels and messages) and for communications with a second processing and response interval (e.g., second channels and messages), where the second processing and response interval is shorter than the first processing and response interval. As such, base station 105-a may transmit to UE 115-a one or more first messages associated with the first processing and response interval and a second message associated with the second processing and response interval. In some cases, UE 115-a may determine that one or more collisions may occur from processing both the first messages and the second message simultaneously. As described herein, UE 115-a may refrain from processing one or more of the first messages located in an exclusion window prior to the second message. Additionally or alternatively, UE 115-a may transmit at least a portion of UCI associated with the first messages based on the determined collisions.

In some cases, base station 105-a may transmit one or more downlink messages to UE 115-a on resources corresponding to a downlink carrier 205. The downlink messages may include one or more first data messages on PDSCHs 215 (e.g., first channels) associated with the first processing and response interval and a second data message on an sPDSCH 220 (e.g., a second channel) associated with the second processing and response interval. Additionally, base station 105-a may schedule PDSCHs 215 and sPDSCH 220 over the same or different CCs of downlink carrier 205. UE 115-a may be in the act of processing one or more of the first data messages on PDSCHs 215 when UE 115-a may receive the second data message on sPDSCH 220 and begin processing the second data message. In order to prevent a collision arising from processing PDSCHs 215 and sPDSCH 220 at the same time, UE 115-a may drop one or more PDSCHs 215 and refrain from processing the corresponding first data messages. UE 115-a may drop the one or more PDSCHs 215 according to an exclusion window, which may include a number of PDSCHs 215 (e.g., number of subframes) prior to sPDSCH 220 whose processing may affect processing sPDSCH 220. The length of the exclusion window may be a capability of UE 115-a and may be reported for each processing and response interval separately. Additionally or alternatively, the length of the exclusion window may be reported for each corresponding sTTI length that includes sPDSCH 220.

If UE 115-a processes a PDSCH 215, UE 115-a may transmit a HARQ ACK/NAK message in a subsequent subframe with respect to the processed PDSCH 215 based on if the processed PDSCH 215 was successfully decoded or not. For example, UE 115-a may transmit HARQ feedback in subframe n+k, where n is the subframe in which the processed PDSCH 215 is received and k is the number of subframes after receiving the processed PDSCH 215 that UE 115-a is to transmit HARQ ACK/NAK. In some cases, for any PDSCH 215 dropped to enable processing of sPDSCH 220, UE 115-a may transmit a NAK in a subsequent subframe with respect to the dropped PDSCH 215 (e.g., n+k). For example, even though UE 115-a may drop one or more of PDSCHs 215, UE 115-a may format any corresponding uplink messages to be transmitted in the subframes as if the respective data is sent (e.g., via an UCI mapping).

Additionally or alternatively, UE 115-a may receive one or more grants from base station 105-a on resources of a carrier 210 for scheduling resources for uplink transmissions on carrier 210. The grants may include PUSCH grants 225 (e.g., first messages) for scheduling one or more first data uplink messages in PUSCHs 235 and an sPUSCH grant 230 (e.g., a second message) for scheduling a second data uplink message. As described above, UE 115-a may determine that a collision may occur when processing data uplink messages associated with PUSCH grants 225 and sPUSCH grant 230 at the same time. As such, UE 115-a may determine to drop one or more PUSCHs 235 and not process the data uplink messages associated with one or more of PUSCH grants 225 located in an exclusion window associated with sPUSCH grant 230.

In some cases, PUSCHs 235 may be scheduled to carry UCI (e.g., ACK/NAK, CQI, PMI, RI, etc.) that UE 115-a may transmit after processing data uplink messages for corresponding PUSCH grants 225. For example, in some cases, a PDSCH 215 may indicate ACK/NACK feedback may be included in a PUSCH 235. However, if UE 115-a drops one or more PUSCHs 235 associated with PUSCH grants 225 in order to process an sPDSCH 220 or process a data uplink message associated with sPUSCH grant 230, the corresponding UCI may not be transmitted. Therefore, UE 115-a may transmit UCI on resources of PUSCHs 235 specified by PUSCH grants 225 (e.g., n+k subframes after PUSCH grants 225) without processing or preparing uplink data. UE 115-a may transmit the UCI according to specifications included in each PUSCH grant 225 (e.g., a number of resources for each UCI component, how and where UCI components are mapped, modulation order used, power control, etc.), where the PUSCH grant 225 assumes the uplink data is to be sent.

In some cases, if the uplink data is not sent (i.e., PUSCH grant 225 is not processed), UE 115-a may send dummy data (e.g., a set of random bits/modulation symbols or a fixed pre-defined sequence of bits to indicate an absence of the uplink data) to keep phase continuity in PUSCHs 235. Additionally or alternatively, base station 105-a may indicate that UE 115-a may only need to transmit HARQ ACK/NAK feedback in the UCI. In some examples, UE 115-a may send dummy or fixed symbols for the uplink data on symbols where the ACK/NAK feedback is mapped (e.g., not on other symbols). In some cases, UE 115-a may transmit a first component of the UCI for the PUSCH grant (e.g., HARQ ACK/NAK feedback) and refrain from transmitting additional components of the UCI (e.g., CQI, PMI, and/or RI).

Additionally or alternatively, if a number of coded bits associated with each of the additional components of the UCI satisfy respective thresholds for each component, UE 115-a may transmit the additional components with the first component of the UCI. For example, CQI, PMI, and RI may not be protected by CRC (e.g., if a number of coded RI bits is less than or equal to 22 and/or if a number of coded CQI/PMI bits is less than or equal to 11). As such, base station 105-a may not search for these components in the UCI since they may not be transmitted, but base station 105-a may still decode something that is wrong. Therefore, if the number of coded bits for the additional components exceed respective thresholds (e.g., the number of coded RI bits is greater than 22 and/or the number of coded CQI/PMI bits is greater than 11), the additional components may be transmitted.

Figure 3:
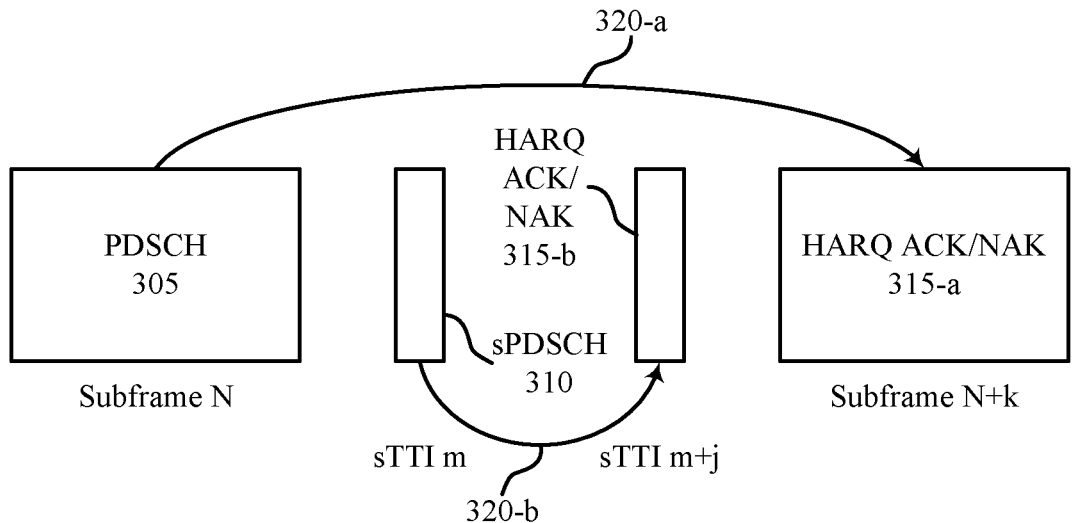
FIG. 3 illustrates an example of a TTI and sTTI processing timeline that supports UCI reporting in accordance with aspects of the present disclosure.

FIG. 3 illustrates an example of a TTI and sTTI processing timeline 300 that supports UCI reporting in accordance with various aspects of the present disclosure. In some examples, TTI and sTTI processing timeline 300 may implement aspects of wireless communications systems 100 and 200. TTI and sTTI processing timeline 300 may include a PDSCH 305 transmitted in a subframe N and a sPDSCH 310 transmitted in an sTTI m. Additionally, a UE 115 may transmit HARQ ACK/NAKs 315 respective to each PDSCH 305 and sPDSCH 310.

In some cases, a base station 105 may schedule PDSCH 305 and sPDSCH 310 with a subframe granularity. Additionally, the base station 105 may schedule PDSCH 305 and sPDSCH 310 over the same or different CCs. As noted, PDSCH 305 may be transmitted in subframe N, and sPDSCH 310 may be transmitted in sTTI m, which may be part of a subsequent subframe. In response to PDSCH 305, the UE 115 may transmit HARQ ACK/NAK 315-a in a subframe N+k after a processing operation 320-a, where the HARQ ACK/NAK may be based on decoding results from PDSCH 305. However, while in the middle of processing operation 320-a, the base station 105 may transmit sPDSCH 310, and the UE 115 may initiate processing operation 320-b in order to decode sPDSCH 310 and transmit HARQ ACK/NAK 315-b in an sTTI m+j. In some cases, sPDSCH 310 may have a higher priority than PDSCH 305. As such, in order to prevent a collision between processing operation 320-a and processing operation 320-b, and to successfully process the higher-prioritized sPDSCH 310, the UE 115 may drop PDSCH 305 and refrain from completing processing operation 320-a. Further, the UE 115 may transmit HARQ ACK/NAK 315-b in sTTI m+j based on the decoding of sPDSCH 310. Additionally, as described herein, the UE 115 may transmit a NAK for HARQ ACK/NAK 315-a in subframe N+k (e.g., because PDSCH 305 was dropped).

Although not shown, a PUSCH grant and an sPUSCH grant may be scheduled in a similar manner to PDSCH 305 and sPDSCH 310, respectively. Similarly, a collision may occur when attempting to simultaneously process data uplink messages for both the PUSCH grant and the sPUSCH grant. For example, the UE 115 may receive the PUSCH grant, start encoding an uplink signal, and prepare an uplink transmission. Before the uplink transmission, the UE 115 may receive the sPUSCH grant, and, due to its shorter processing time, may first prepare an uplink transmission associated with the sPUSCH grant. Accordingly, the UE 115 may not be able to handle both PUSCH and sPUSCH transmissions. As such, the UE 115 may refrain from processing the data uplink message associated with the PUSCH grant in order to process a data uplink message associated with the sPUSCH grant and send an sPUSCH transmission, which may correspond to a higher priority than the uplink transmission associated with the PUSCH grant. In some cases, the UE 115 may transmit an indication that data was not processed in response to the PUSCH grant along with a portion of UCI associated with the PUSCH grant.

While TTI and sTTI processing timeline 300 is described in terms of a collision occurring between a TTI and an sTTI, it is to be understood that the processing timeline may include collisions that occur between any communications on corresponding channels or include corresponding messages with different processing and response intervals. For example, the UE 115 may communicate according to different RATs that include respective, different processing and response intervals, such that collisions occur when the UE 115 attempts to process communications for a first RAT and communications for a second RAT simultaneously.

Figure 4:
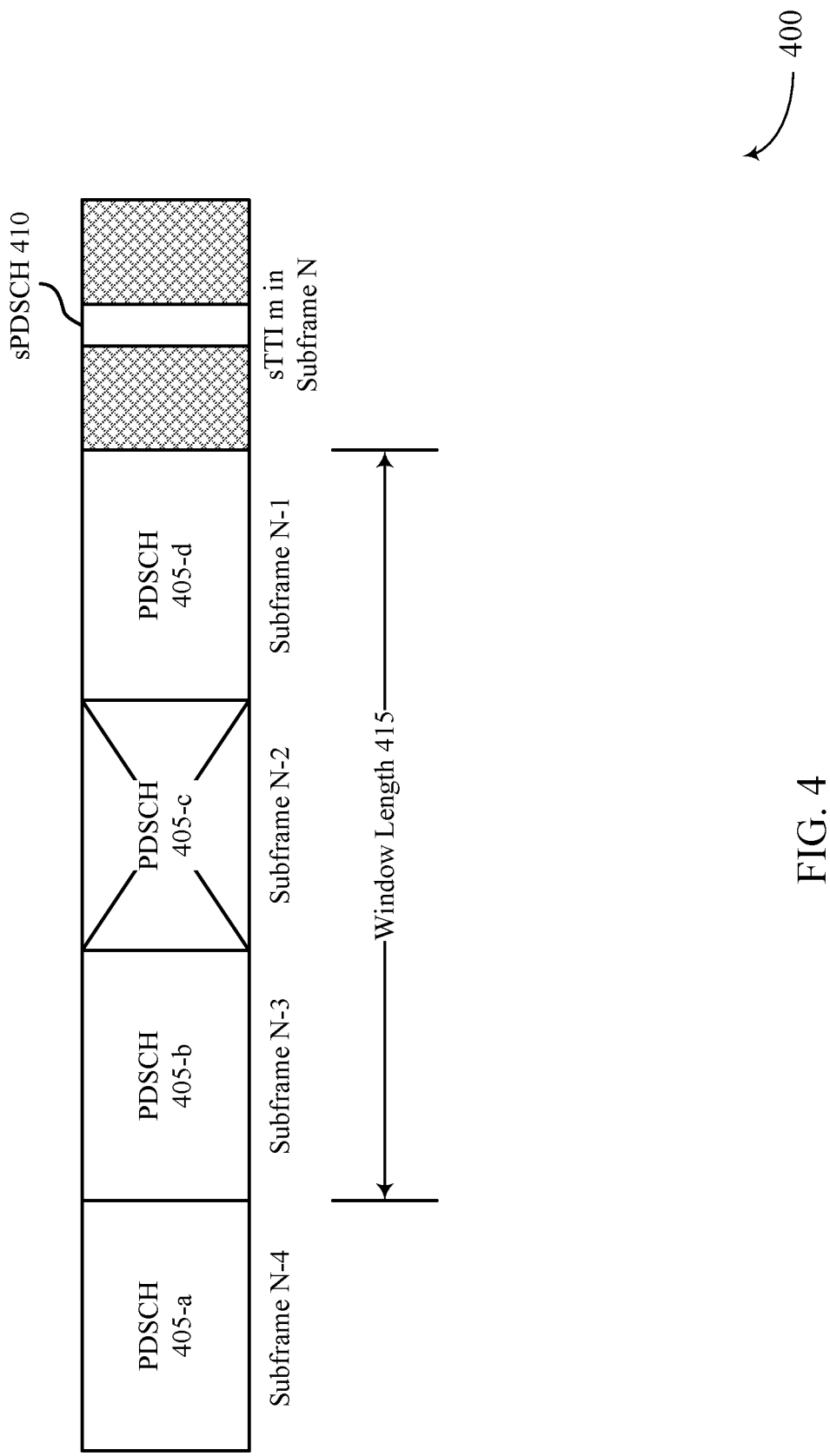
FIG. 4 illustrates an example of a downlink subframe dropping scheme that supports UCI reporting in accordance with aspects of the present disclosure.

FIG. 4 illustrates an example of a downlink subframe dropping scheme 400 that supports UCI reporting in accordance with various aspects of the present disclosure. In some examples, downlink subframe dropping scheme 400 may implement aspects of wireless communications systems 100 and 200. As described herein, downlink subframe dropping scheme 400 may illustrate techniques for dropping one or more first data messages associated with a first processing and response interval in order to process a second data message with a higher priority associated with a second processing and response interval. In some cases, the first data messages may be PDSCHs 405 (e.g., first channels), and the second data message may be an sPDSCH 410 (e.g., a second channel).

A UE 115 may receive sPDSCH 410 in an sTTI m in subframe N from a base station 105. Additionally, the UE 115 may receive a number of PDSCHs 405 in subframes prior to subframe N. For example, the UE 115 may receive PDSCH 405-*a* in subframe N−4, PDSCH 405-*b* in subframe N−3, PDSCH 405-*c* in subframe N−2, and PDSCH 405-*d* in subframe N−1. As described above, the UE 115 may drop one or more PDSCHs 405 in order to process sPDSCH 410, where the one or more dropped PDSCHs 405 may be determined based on a contention window. The contention window may include a number of subframes prior to subframe N according to a window length 415 (e.g., $W_{DL}$). Window length 415 may be a capability of the UE 115 and may be reported for each channel length (e.g., sPDSCH 410, sTTI, etc.) or processing timeline separately. In one example, as shown, window length 415 may be equal to three subframes (e.g., any PDSCH 405 scheduled in subframes N−1 to N−$W_{DL}$ may be dropped over any CC, where $W_{DL}$=3). Therefore, PDSCH 405-*b*, PDSCH 405-*c*, and PDSCH 405-*d* in subframes N−3, N−2, and N−1, respectively, may be included in the contention window. As such, the UE 115 may drop one or more of PDSCH 405-*b*, PDSCH 405-*c*, and PDSCH 405-*d* in order to process sPDSCH 410. In one example, the UE 115 may determine that processing PDSCH 405-*c* in subframe N−2 may collide with processing sPDSCH 410 and, therefore, may refrain from processing PDSCH 405-*c*.

As described above with reference to FIGS. 1-3, if a PDSCH 405 is processed, the UE 115 may transmit a HARQ ACK/NAK message in a subsequent subframe with respect to the processed PDSCH 405 (e.g., subframe n+k). Alternatively, for any PDSCH 405 that is dropped, the UE 115 may transmit a NAK in a subsequent subframe with respect to the dropped PDSCH 405 (e.g., n+k). In one example of downlink subframe dropping scheme 400, the UE 115 may decode PDSCHs 405-*a*, 405-*b*, and 405-*d* and transmit respective HARQ ACK/NAK messages based on the decoding. Additionally, the UE 115 may refrain from decoding PDSCH 405-*c* and may accordingly transmit a NAK in a subsequent subframe. The base station 105 may not be aware whether the NAK indicates the corresponding PDSCH was not processed or if a modulation and coding scheme (MCS) was not determined properly for the PDSCH. The base station 105 may subsequently determine how to respond to the NAK and in some cases, upon receiving the ACK/NAK feedback, the base station 105 may determine not to use the same transport block in a subsequent transmission.

In some cases, a PDSCH 405 may be associated with a first RAT, and an sPDSCH 410 may be associated with a second RAT, where the second RAT includes a shorter processing and response timeline than the first RAT. Accordingly, the dropping scheme 400 and contention window determination as described above may be applied based on the processing and response timelines for the different RATs.

Figure 5:
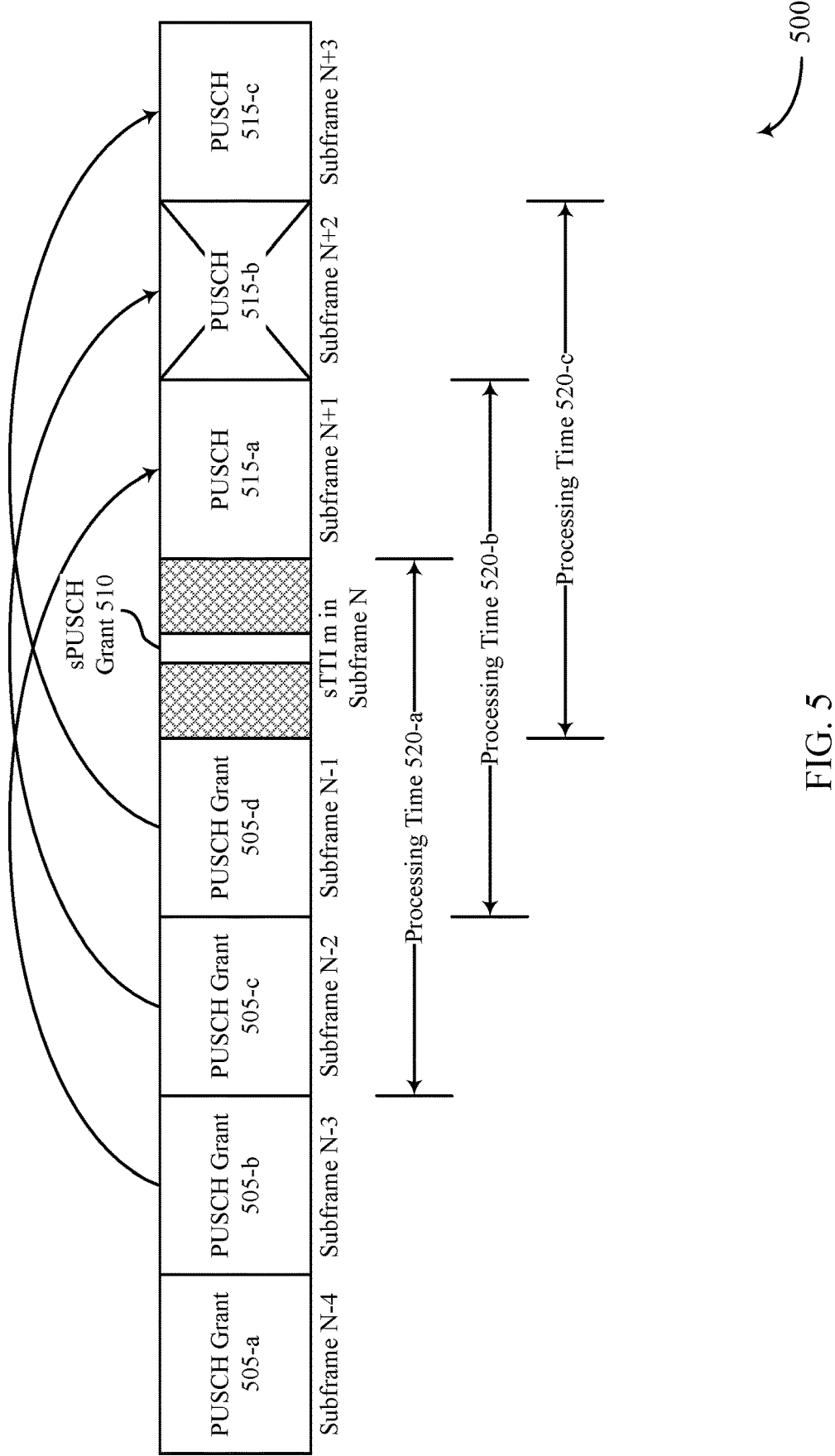
FIG. 5 illustrates an example of an uplink grant dropping scheme that supports UCI reporting in accordance with aspects of the present disclosure.

FIG. 5 illustrates an example of an uplink grant dropping scheme 500 that supports UCI reporting in accordance with various aspects of the present disclosure. In some examples, uplink grant dropping scheme 500 may implement aspects of wireless communications systems 100 and 200. As described herein, uplink grant dropping scheme 500 may illustrate techniques for dropping one or more first uplink grants (e.g., first messages) associated with a first processing and response interval in order to process a second uplink grant (e.g., a second message) with a higher priority associated with a second processing and response interval. In some cases, the first uplink grants may be PUSCH grants 505, and the second uplink grant may be an sPUSCH grant 510. The PUSCH grants 505 may schedule resources for transmitting first data messages in corresponding PUSCHs 515.

A UE 115 may receive sPUSCH grant 510 from a base station 105 in an sTTI m of subframe N. Additionally, the UE 115 may receive a number of PUSCH grants 505 in subframes prior to subframe N. For example, the UE 115 may receive PUSCH grant 505-*a* in subframe N−4, PUSCH grant 505-*b* in subframe N−3, PUSCH grant 505-*c* in subframe N−2, and PUSCH grant 505-*d* in subframe N−1. Each PUSCH grant 505 may correspond to a PUSCH 515 based on a processing time 520 for each PUSCH grant 505, where each PUSCH grant 505 may schedule resources for uplink transmissions in the corresponding PUSCH 515. For example, PUSCH grant 505-*b* may schedule resources in PUSCH 515-*a* after processing time 520-*a*, PUSCH grant 505-*c* may schedule resources in PUSCH 515-*b* after processing time 520-*b*, and PUSCH grant 505-*d* may schedule resources in PUSCH 515-*c* after processing time 520-*c*.

As described above, the UE 115 may drop one or more PUSCHs 515 in order to process a data uplink message associated with sPUSCH grant 510. In some cases, the UE 115 may drop the one or more PUSCHs 515 by refraining from or stopping processing data uplink messages associated with one or more PUSCH grants 505, where the one or more PUSCHs 515 that may be dropped are determined based on a contention window for PUSCH grants 505. The contention window may include a number of subframes prior to subframe N according to a window length (e.g., $W_{UL}$). The window length may be a capability of the UE 115 and may be reported for each channel or message length (e.g., sPUSCH grant 510, sTTI, etc.) or processing timeline separately. For example, the window length may be equal to three subframes, similar to the contention window as shown with respect to FIG. 4, and any PUSCH 515 whose PUSCH grant 505 is received in subframes N−1 to N−$W_{UL}$ may be dropped over any CCs, (e.g., where $W_{UL}$=3).

Therefore, PUSCH grant 505-*b* in subframe N−3 corresponding to PUSCH 515-*a*, PUSCH grant 505-*c* in subframe N−2 corresponding to PUSCH 515-*b*, and PUSCH grant 505-*d* in subframe N−1 corresponding to PUSCH 515-*c* may be part of the contention window. As such, the UE 115 may drop one or more of PUSCH 515-*a*, PUSCH 515-*b*, and PUSCH 515-*c* by refraining from processing data uplink messages associated with PUSCH grant 505-*b*, PUSCH grant 505-*c*, and/or PUSCH grant 505-*d*, respectively, in order to process sPUSCH grant 510. In one example, the UE 115 may determine that processing a first data uplink message associated with PUSCH grant 505-*c* in subframe N−2 may collide with processing a second data uplink message associated with sPUSCH grant 510. Therefore, the UE 115 may refrain from processing the first data uplink message and may drop PUSCH 515-*b* in order to process the second data uplink message. In some cases, the UE 115 may transmit PUSCHs 515 on different CCs of a carrier.

In some cases, PUSCHs 515 may be scheduled to carry UCI (e.g., HARQ ACK/NAK, CQI/PMI, RI, etc.) that the UE 115 may transmit after processing data uplink messages for corresponding PUSCH grants 505. As described above with respect to FIG. 1, the UE 115 may transmit the UCI in a subframe along with a PUSCH 515 if the UE 115 is configured for a single serving cell and is not configured for simultaneous PUSCH and PUCCH transmissions. Additionally or alternatively, the UE 115 may transmit the UCI on a primary cell, or a secondary cell with a smallest index, if the UE 115 is configured with more than one serving cell, if the UE 115 is not configured for simultaneous PUSCH and PUCCH transmissions, and if the UCI consists of periodic CSI and/or HARQ ACK. The UE 115 may determine the cell (e.g., primary or secondary cell) on which to transmit the UCI based on the cell the UE 115 is transmitting the PUSCH 515 on. For example, if the UE 115 transmits PUSCH 515 on the primary cell, then the UE 115 may also transmit the UCI on the primary cell, and if PUSCH 515 is on at least one secondary cell, then the UE 115 may transmit the UCI on the secondary cell with the smallest index. Additionally or alternatively, the UE 115 may refrain from transmitting UCI if the PUSCH 515 corresponds to a RAR grant or is a retransmission of the same transport block as part of a contention based random access procedure.

As described above with reference to uplink grant dropping scheme 500, the UE 115 may determine to not process a data uplink message associated with a PUSCH grant 505, may drop corresponding PUSCH 515, and therefore the UE 115 may not transmit the UCI. The base station 105 may not be aware of which PUSCHs 515 were processed or not. Accordingly, the UE 115 may transmit UCI on specified PUSCHs 515, as scheduled by the corresponding PUSCH grants 505 in the contention window, without processing or preparing the data uplink messages if the UE 115 determines to drop one or more PUSCHs 515. The UE 115 may schedule the UCI on resources of PUSCHs 515 corresponding to a configuration that may assume the uplink data was to be transmitted. For example, a number of resources for each UCI component, how and where UCI components are mapped, a modulation order used, a power control, etc. may follow the configuration defined in PUSCH grant 505 for UCI that are assumed to be transmitted with uplink data. If the uplink data is not sent, the UE 115 may send dummy data (e.g., a set of random bits/modulation symbols or a fixed pre-defined sequence of bits to indicate an absence of the uplink data) to keep phase continuity in the PUSCH 515. Additionally or alternatively, the base station 105 may indicate that the UE 115 may need to only transmit HARQ ACK/NAK feedback in the UCI. In some cases, the UE 115 may send dummy or fixed symbols for the uplink data on symbols where the ACK/NAK feedback is mapped (e.g., not on other symbols).

For example, the UE 115 may receive sPUSCH grant 510 in sTTI m in subframe N. As such, the UE 115 may determine to not process a data uplink message for PUSCH 515-b associated with PUSCH grant 505-c on a primary cell, which may also include UCI for a physical uplink control channel (PUCCH) group. Additionally or alternatively, the UE 115 may process PUSCH grants 505 and transmit corresponding PUSCHs 515 on other cells (e.g., secondary cells). In some cases, the UE 115 may then transmit UCI on resources for PUSCH 515-b according to PUSCH grant 505-c over the primary cell by transmitting UCI created by assuming the uplink data is transmitted. In some examples, the base station 105 may look for the UCI and uplink data separately and receive the UCI, but not decode the data.

In some cases, sPUSCH grant 510 may trigger aperiodic sTTI CSI reporting. As such, if the UE 115 receives a PUSCH grant 505 within the exclusion window that also triggers an aperiodic CSI reporting, the UE 115 may process both CSI reports (e.g., even though the PUSCH grant 505 may not be processed). In order to reduce processing for the UE 115, one or more components of the UCI may be dropped if said one or more components are related to PUSCHs 515 corresponding to PUSCH grants 505 within the contention window of sPUSCH grant 510. For example, the UE 115 may transmit a first component of the UCI for a PUSCH 515 (e.g., HARQ ACK/NAK feedback) and refrain from transmitting additional components of the UCI (e.g., CQI, PMI, and/or RI). Additionally or alternatively, if a number of coded bits associated with each of the additional components of the UCI satisfy respective thresholds for each component, the UE 115 may transmit the additional components along with the first component of the UCI. For example, CQI, PMI, and RI may not be protected by CRC (e.g., if a number of coded RI bits is less than or equal to 22 and/or if a number of coded CQI/PMI bits is less than or equal to 11), and the base station 105 may not search for these components in the UCI since they may not be transmitted. However, in some cases, the base station 105 may attempt to decode the UCI, which may result in an error. Therefore, if the number of coded bits for the additional components exceed respective thresholds (e.g., the number of coded RI bits is greater than 22 and/or the number of coded CQI/PMI bits is greater than 11), the additional components may be transmitted.

In some cases, a PUSCH grant 505 may be associated with a first RAT, and an sPUSCH grant 510 may be associated with a second RAT, where the second RAT includes a shorter processing and response timeline than the first RAT. Accordingly, the dropping scheme 400 and contention window determination as described above may be applied based on the processing and response timelines for the different RATs.

Figure 6:
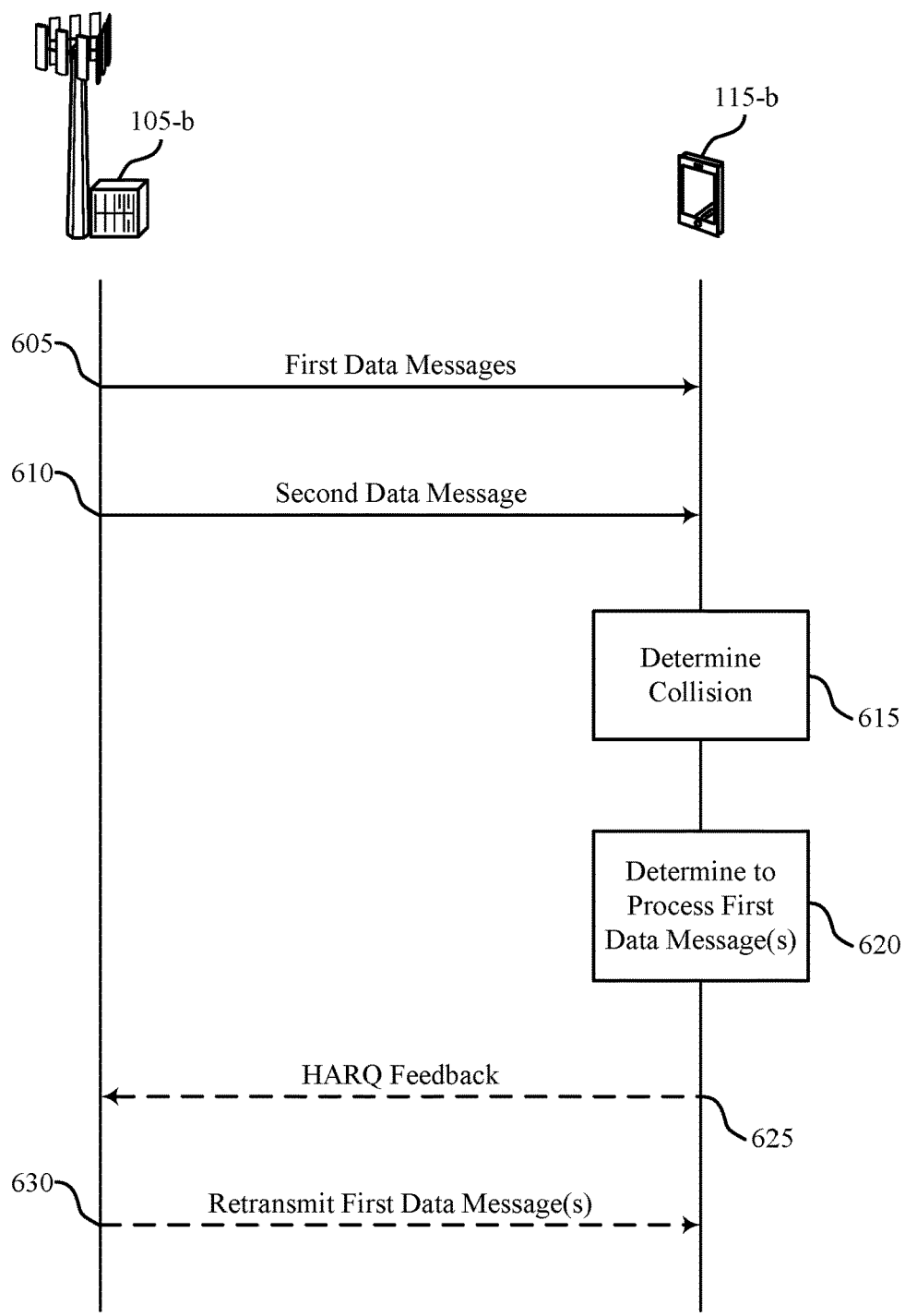
FIGS. 6 and 7 illustrate examples of process flows that support UCI reporting in accordance with aspects of the present disclosure.

FIG. 6 illustrates an example of a process flow 600 that supports UCI reporting in accordance with various aspects of the present disclosure. In some examples, process flow 600 may implement aspects of wireless communications systems 100 and 200. Process flow 600 may include a base station 105-b and a UE 115-b, which may be examples of corresponding base stations 105 and UEs 115 as described with reference to FIGS. 1-5. Base station 105-b and UE 115-b may utilize techniques as described herein to mitigate collisions between processing transmissions associated with a first processing timeline (e.g., on a first channel) transmissions associated with a second processing timeline (e.g., on a second channel). The techniques utilized may correspond to techniques as described with reference to downlink subframe dropping scheme 400 of FIG. 4.

In the following description of the process flow 600, the operations between UE 115-b and base station 105-b may be performed in different orders or at different times. Certain operations may also be left out of the process flow 600, or other operations may be added to the process flow 600. It is to be understood that while UE 115-b and base station 105-b are shown performing a number of the operations of process flow 600, any wireless device may perform the operations shown.

At 605, base station 105-b may transmit, to UE 115-b, one or more first data messages (e.g., PDSCHs), each of the one or more first data messages having a first feedback interval (e.g., associated with a first TTI, a one millisecond subframe, a first channel, a first message, etc.).

At 610, base station 105-b may transmit, to UE 115-b, a second data message (e.g., sPDSCH) having a second feedback interval (e.g., associated with a second TTI, an sTTI, a second channel, a second message etc.), the second feedback interval being shorter than the first feedback interval. In some examples, base station 105-b may transmit the first and second data messages such that the one or more first data messages may be received within an exclusion window of the second data message and such that processing, by UE 115-b, of at least one of the one or more first data messages may collide with processing, by UE 115-b, of the second data message. In some cases, UE 115-b may receive the second data message after receipt of the one or more first data messages. Additionally, the second data message may have a higher priority than any of the one or more first data messages, and at least one of the one or more first data messages may also be transmitted over a different component carrier than the second data message.

At 615, UE 115-b may determine, for each of the one or more first data messages within the exclusion window of the second data message, whether a collision exists between processing of the one or more first data messages and processing of the second data message.

At 620, UE 115-b may determine whether to process individual ones of the one or more first data messages in the exclusion window based on whether corresponding collisions were determined. In some cases, UE 115-b may refrain from processing at least one of the one or more first data messages in the exclusion window based on an existence of a collision with processing of the second data message, where the at least one of the one or more first data messages includes an indication to transmit HARQ ACK feedback for the corresponding first data message. Additionally or alternatively, UE 115-b may process at least one of the one or more first data messages in the exclusion window based on an absence of a collision with processing of the second data message.

At 625, UE 115-b may format the first data message in accordance with the first data message being scheduled to carry UCI and the first data and then transmit HARQ feedback for the one or more first data messages based on the determination to process the one or more first data messages at 620. If UE 115-b refrains from processing at least one or more first data messages, UE 115-b may transmit a NAK to base station 105-b for the one or more first data messages that were not processed based on the indication to transmit the HARQ ACK feedback. Accordingly, UE 115-b may transmit the NAK during a subframe in which the HARQ ACK feedback for the one or more first data messages that are not processed are scheduled to be transmitted. Alternatively, if UE 115-b processes one or more of the first data messages, UE 115-b may transmit HARQ feedback to base station 105-b for the processed one or more first data messages.

At 630, if a NAK is received at 625, base station 105-b may retransmit one or more first data messages based on receipt of the NAK.

Figure 7:
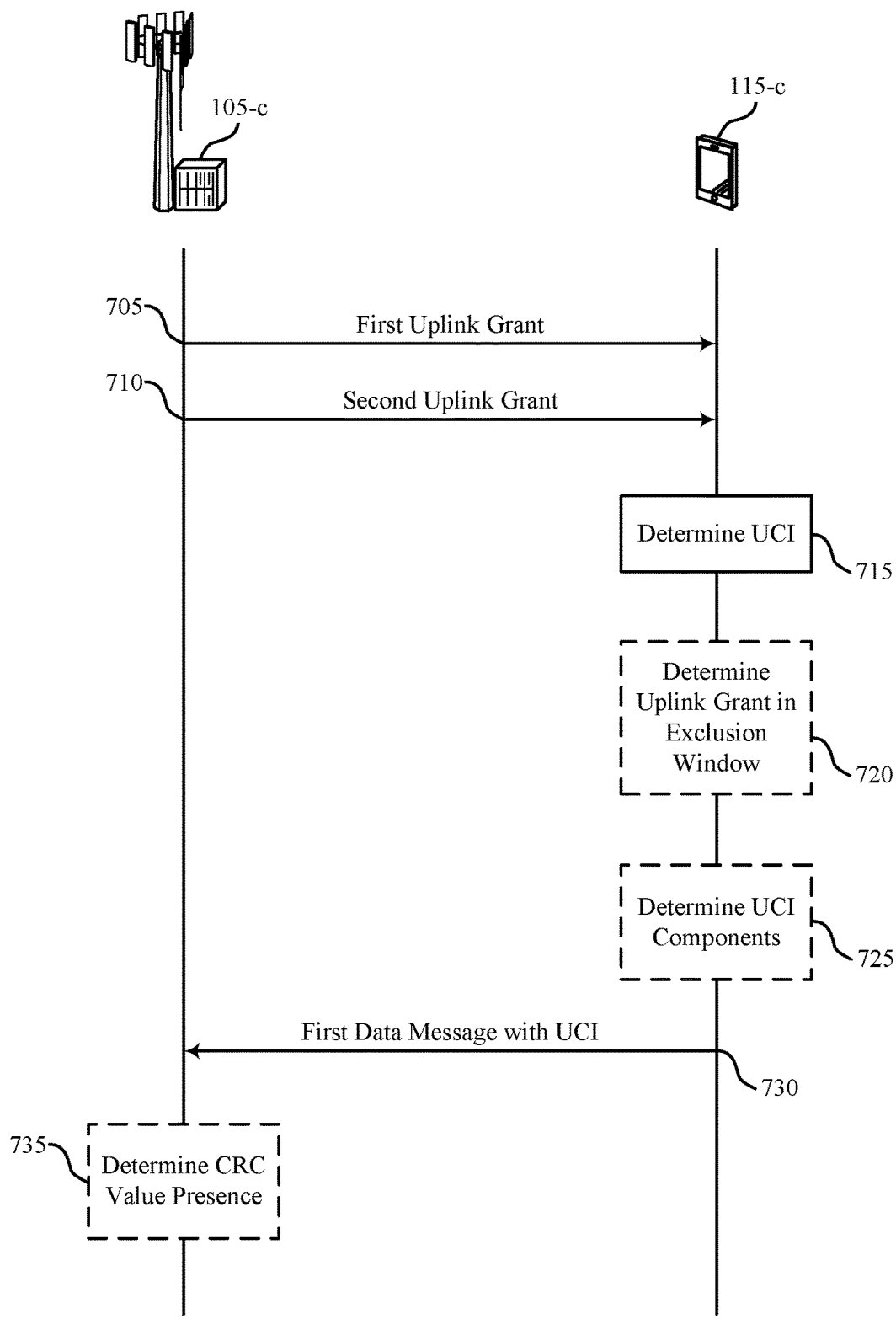

FIG. 7 illustrates an example of a process flow FIG. 700 that supports UCI reporting in accordance with various aspects of the present disclosure. In some examples, process flow FIG. 700 may implement aspects of wireless communications systems 100 and 200. Process flow 700 may include a base station 105-c and a UE 115-c, which may be examples of corresponding base stations 105 and UEs 115 as described with reference to FIGS. 1-6. Base station 105-c and UE 115-c may utilize techniques as described herein to mitigate collisions between processing uplink grants (e.g., first messages) associated with a first processing timeline and uplink grants (e.g., second messages) associated with a second processing timeline. The techniques utilized may correspond to techniques as described with reference to uplink grant dropping scheme 500 in FIG. 5.

In the following description of the process flow 700, the operations between UE 115-c and base station 105-c may be performed in different orders or at different times. Certain operations may also be left out of the process flow 700, or other operations may be added to the process flow 700. It is to be understood that while UE 115-c and base station 105-c are shown performing a number of the operations of process flow 700, any wireless device may perform the operations shown.

At 705, base station 105-c may transmit a first uplink grant (e.g., a PUSCH grant, a first message, etc.) scheduling transmission, by UE 115-c, of first data in a first data message (e.g., PUSCH) after a first response interval (e.g., associated with a first TTI, a one millisecond subframe, the first message, a first channel, etc.).

At 710, base station 105-c may transmit, to UE 115-c, a second uplink grant (e.g., sPUSCH grant, a second message, etc.) scheduling transmission of second data in a second data message (e.g., sPUSCH) after a second response interval (e.g., associated with a second TTI, an sTTI, the second message, a second channel, etc.), where the second response interval is shorter than the first response interval. In some cases, base station 105-c may transmit the second uplink grant such that the first uplink grant is within an exclusion window of the second uplink grant. Additionally, the second data message may have a higher priority than the first data message, and the second data message may be transmitted over a different component carrier than the first data message. In some cases, UE 115-c may also receive the second uplink grant after receipt of the first uplink grant.

At 715, UE 115-c may determine that the first data message is scheduled to carry UCI.

At 720, UE 115-c may further determine that the first uplink grant is within the exclusion window of the second uplink grant.

At 725, UE 115-c may determine which components of the UCI to transmit to base station 105-c. In some cases, UE 115-c may determine that a number of encoded RI bits in the UCI satisfies an encoded RI threshold. Additionally or alternatively, UE 115-c may determine that a number of encoded CQI and PMI bits in the UCI satisfies an encoded CQI/PMI threshold. Accordingly, UE 115-c may include HARQ data, RI, and CQI/PMI in the at least the portion of the UCI to be transmitted in the first data message to base station 105-c. Additionally or alternatively, UE 115-c may determine that a number of encoded RI bits in the UCI does not satisfy an encoded RI threshold or that a number of encoded CQI and PMI bits in the UCI does not satisfy an encoded CQI/PMI threshold. As such, UE 115-c may include only HARQ data in the at least the portion of the UCI to be transmitted in the first data message to base station 105-c.

At 730, UE 115-c may transmit, to base station 105-c based on the first data message being scheduled to carry the UCI, at least a portion of the UCI in the first data message without including the first data in the first data message. In some examples, UE 115-c may transmit the at least the portion of the UCI in the first data message without including the first data in the first data message based on the first uplink grant being within an exclusion window. In some cases, UE 115-c may transmit the first data message using a format that is based on inclusion of both the first data and the UCI in the first data message. Additionally or alternatively, UE 115-c may include dummy data in place of the first data in the first data message, where the dummy data may be a set of random bits (e.g., modulation symbols) or a fixed pre-defined sequence of bits that indicates an absence of encoded first data. The at least a portion of the UCI may include the determined components that UE 115-c determined at 725. In some cases, the at least the portion of the UCI to be transmitted in the first data message may be limited to HARQ data. In some examples, base station 105-c may receive the first data message in a format that is based on inclusion of both the first data and the UCI in the first data message.

At 735, base station 105-c may determine that the first data message includes a CRC value. Accordingly, base station 105-c may attempt to decode RI data, CQI and PMI data, and HARQ data in the at least the portion of the UCI of the first data message based on a presence of the CRC value. Additionally or alternatively, base station 105-c may determine that the first data message does not include a CRC value. As such, base station 105-c may attempt to decode only HARQ data in the at least the portion of the UCI of the first data message based on an absence of the CRC value.

Figure 8:
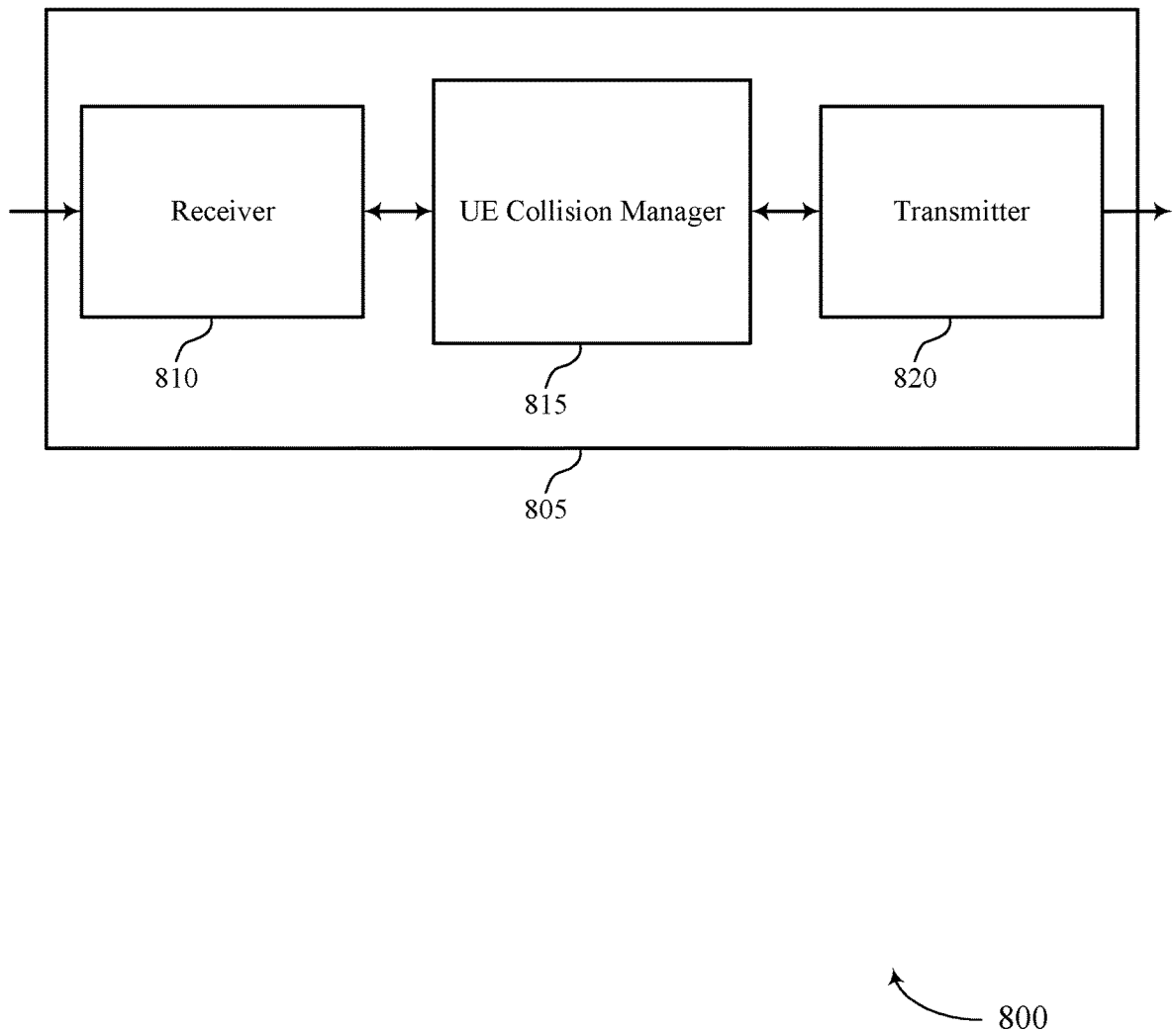
FIGS. 8 through 10 show block diagrams of a device that supports UCI reporting in accordance with aspects of the present disclosure.

FIG. 8 shows a block diagram 800 of a wireless device 805 that supports UCI reporting in accordance with aspects of the present disclosure. Wireless device 805 may be an example of aspects of a UE 115 as described herein. Wireless device 805 may include receiver 810, UE collision manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to UCI reporting, etc.). Information may be passed on to other components of the device. The receiver 810 may be an example of aspects of the transceiver 1135 described with reference to FIG. 11. The receiver 810 may utilize a single antenna or a set of antennas.

UE collision manager 815 may be an example of aspects of the UE collision manager 1115 described with reference to FIG. 11.

UE collision manager 815 and/or at least some of its various sub-components may be implemented in hardware, software executed by a processor, firmware, or any combination thereof. If implemented in software executed by a processor, the functions of the UE collision manager 815 and/or at least some of its various sub-components may be executed by a general-purpose processor, a digital signal processor (DSP), an application-specific integrated circuit (ASIC), or a field-programmable gate array (FPGA). Additionally the functions of UE collision manager 815 and/or at least some of its various sub-components may be executed by any other programmable logic device, discrete gate or transistor logic, discrete hardware components, or any combination thereof designed to perform the functions described in the present disclosure. The UE collision manager 815 and/or at least some of its various sub-components may be physically located at various positions, including being distributed such that portions of functions are implemented at different physical locations by one or more physical devices. In some examples, UE collision manager 815 and/or at least some of its various sub-components may be a separate and distinct component in accordance with various aspects of the present disclosure. In other examples, UE collision manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE collision manager 815 may receive one or more first data receive messages, each of the one or more first data messages having a first feedback interval. UE collision manager 815 may also receive, after receipt of the one or more first data messages, a second data message having a second feedback interval, where the second feedback interval is shorter than the first feedback interval. UE collision manager 815 may determine, for each of the one or more first data messages within an exclusion window of the second data message, whether a collision exists between processing of the one or more first data messages and processing of the second data message. UE collision manager 815 may further determine whether to process individual ones of the one or more first data messages in the exclusion window based on whether corresponding collisions were determined.

Additionally or alternatively, UE collision manager 815 may receive a first uplink grant scheduling transmission of first data in a first data transmit message after a first response interval. UE collision manager 815 may also receive, after receipt of the first uplink grant, a second uplink grant scheduling transmission of second data in a second data transmit message after a second response interval, where the second response interval is shorter than the first response interval. UE collision manager 815 may determine that the first data transmit message is scheduled to carry UCI. In some cases, UE collision manager 815 may format the first data message in accordance with the first data message being scheduled to carry UCI and the first data and may transmit at least a portion of the UCI in the first data transmit message without including the first data in the first data message, based on the first data message being scheduled to carry the UCI.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Figure 9:
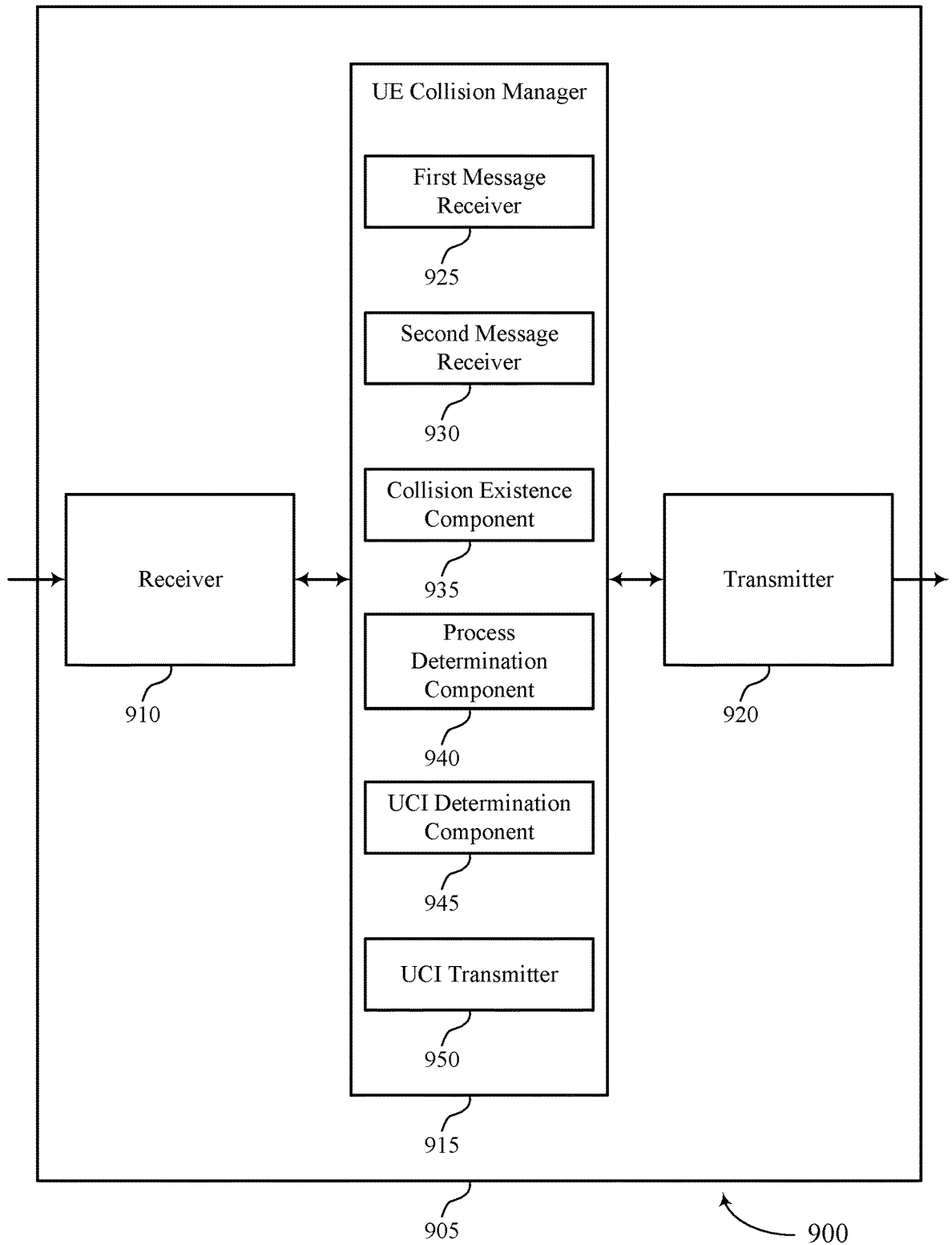

FIG. 9 shows a block diagram 900 of a wireless device 905 that supports UCI reporting in accordance with aspects of the present disclosure. Wireless device 905 may be an example of aspects of a wireless device 805 or a UE 115 as described with reference to FIG. 8. Wireless device 905 may include receiver 910, UE collision manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to UCI reporting, etc.). Information may be passed on to other components of the device. The receiver 910 may be an example of aspects of the transceiver 1135 described with reference to FIG. 11. The receiver 910 may utilize a single antenna or a set of antennas.

UE collision manager 915 may be an example of aspects of the UE collision manager 1115 described with reference to FIG. 11.

UE collision manager 915 may also include first message receiver 925, second message receiver 930, collision existence component 935, process determination component 940, UCI determination component 945, and UCI transmitter 950.

First message receiver 925 may receive one or more first data receive messages, each of the one or more first data receive messages having a first feedback interval. Additionally or alternatively, first message receiver 925 may receive a first uplink grant scheduling transmission of first data in a first data transmit message, after a first response interval.

Second message receiver 930 may receive, after receipt of the one or more first data receive messages, a second data receive message having a second feedback interval, where the second feedback interval is shorter than the first feedback interval. Additionally or alternatively, second message receiver 930 may receive, after receipt of the first uplink grant, a second uplink grant scheduling transmission of second data in a second data transmit message after a second response interval, where the second response interval is shorter than the first response interval. In some cases, the second data message (e.g., second data receive message or second data transmit message) may have a higher priority than any of the one or more first data messages (e.g., one or more first data receive message or first data transmit message).

Collision existence component 935 may determine, for each of the one or more first data receive messages within an exclusion window of the second data receive message, whether a collision exists between processing of the one or more first data receive messages and processing of the second data receive message. Collision existence component 935 may also determine whether a collision exists between transmission of the first data transmit message scheduled by the first uplink grant (after the first response interval) and transmission of the second data transmit message scheduled by the second uplink grant (after the second response interval).

Process determination component 940 may determine whether to process individual ones of the one or more first data receive messages in the exclusion window based on whether corresponding collisions were determined. In some cases, process determination component 940 may refrain from processing at least one of the one or more first data receive messages in the exclusion window based on an existence of a collision with processing of the second data receive message, where the at least one of the one or more first data messages comprises an indication to transmit HARQ ACK feedback for the corresponding first data message. Alternatively, process determination component 940 may process at least one of the one or more first data receive messages in the exclusion window based on an absence of a collision with processing of the second data receive message.

UCI determination component 945 may determine that the first data transmit message scheduled by the first uplink grant is scheduled to carry UCI. Additionally, in some cases, UCI determination component 945 may format the first data message in accordance with the first data message being scheduled to carry UCI and the first data.

UCI transmitter 950 may transmit, based on the first data transmit message being scheduled to carry the UCI, at least a portion of the UCI in the first data transmit message without including the first data in the first data transmit message. In some cases, transmitting at least the portion of the UCI in the first data transmit message may include transmitting the first data transmit message using a format that is based on inclusion of both the first data and the UCI in the first data transmit message. Alternatively, transmitting at least the portion of the UCI in the first data transmit message may include transmitting dummy data in place of the first data in the first data transmit message. In some cases, the dummy data may be a set of random bits (e.g., modulation symbols) or a fixed pre-defined sequence of bits that indicates an absence of encoded first data. In some cases, the at least the portion of the UCI to be transmitted in the first data transmit message may be limited to HARQ data.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
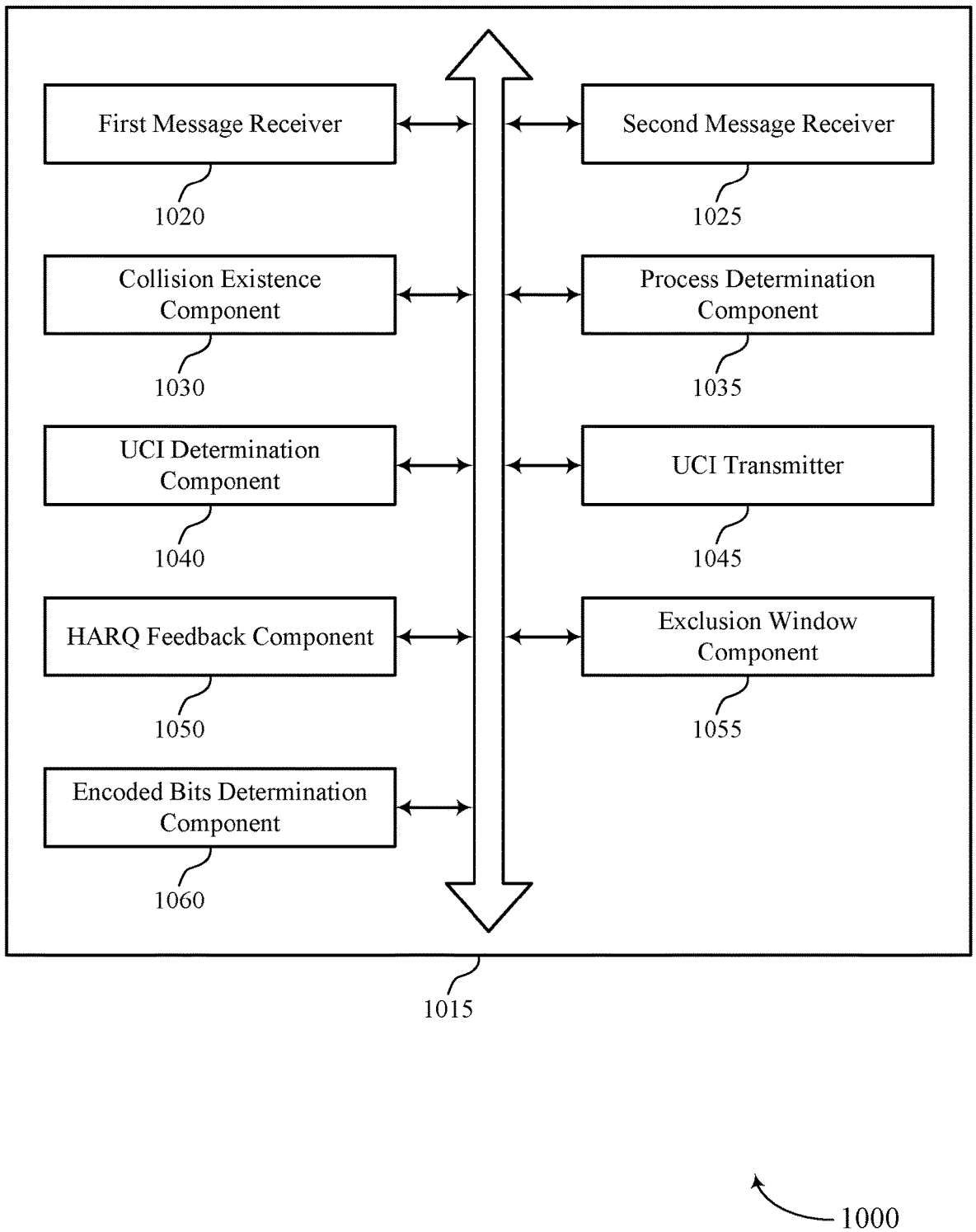

FIG. 10 shows a block diagram 1000 of a UE collision manager 1015 that supports UCI reporting in accordance with aspects of the present disclosure. The UE collision manager 1015 may be an example of aspects of a UE collision manager 815, a UE collision manager 915, or a UE collision manager 1115 described with reference to FIGS. 8, 9, and 11. The UE collision manager 1015 may include first message receiver 1020, second message receiver 1025, collision existence component 1030, process determination component 1035, UCI determination component 1040, UCI transmitter 1045, HARQ feedback component 1050, exclusion window component 1055, and encoded bits determination component 1060. Each of these modules may communicate, directly or indirectly, with one another (e.g., via one or more buses).

First message receiver 1020 may receive one or more first data receive messages, each of the one or more first data receive messages having a first feedback interval. Additionally or alternatively, first message receiver 1020 may receive a first uplink grant scheduling transmission of first data in a first data transmit message after a first response interval.

Second message receiver 1025 may receive, after receipt of the one or more first data receive messages, a second data receive message having a second feedback interval, where the second feedback interval is shorter than the first feedback interval. Additionally or alternatively, second message receiver 1025 may receive, after receipt of the first uplink grant, a second uplink grant scheduling transmission of second data in a second data transmit message after a second response interval, where the second response interval is shorter than the first response interval. In some cases, the second data message (e.g., second data receive message or second data transmit message) may have a higher priority than any of the one or more first data messages (e.g., one or more first data receive message or first data transmit message).

Collision existence component 1030 may determine, for each of the one or more first data receive messages within an exclusion window of the second data receive message, whether a collision exists between processing of the one or more first data receive messages and processing of the second data receive message. Collision existence component 1030 may also determine whether a collision exists between transmission of the first data transmit message scheduled by the first uplink grant (after the first response interval associated with the first TTI) and transmission of the second data transmit message scheduled by the second uplink grant (after the second response interval associated with the second TTI).

Process determination component 1035 may determine whether to process individual ones of the one or more first data receive messages in the exclusion window based on whether corresponding collisions were determined. In some cases, process determination component 1035 may refrain from processing at least one of the one or more first data receive messages in the exclusion window based on an existence of a collision with processing of the second data receive message, where the at least one of the one or more first data messages comprises an indication to transmit HARQ ACK feedback for the corresponding first data message. Alternatively, process determination component 1035 may process at least one of the one or more first data receive messages in the exclusion window based on an absence of a collision with processing of the second data receive message.

UCI determination component 1040 may determine that the first data transmit message scheduled by the first uplink grant is scheduled to carry UCI. Additionally, in some cases, UCI determination component 1040 may format the first data message in accordance with the first data message being scheduled to carry UCI and the first data.

UCI transmitter 1045 may transmit, based on the first data transmit message being scheduled to carry the UCI, at least a portion of the UCI in the first data transmit message without including the first data in the first data transmit message. In some cases, transmitting at least the portion of the UCI in the first data transmit message may include transmitting the first data transmit message using a format that is based on inclusion of both the first data and the UCI in the first data transmit message. In some cases, transmitting at least the portion of the UCI in the first data message may include transmitting dummy data in place of the first data in the first data transmit message. In some cases, the dummy data is a set of random bits (e.g., modulation symbols) or a fixed pre-defined sequence of bits that indicates an absence of encoded first data. In some cases, the at least the portion of the UCI to be transmitted in the first data transmit message may be limited to HARQ data.

HARQ feedback component 1050 may transmit a NAK to a base station that transmitted the at least one of the one or more first data receive messages based on the indication to transmit the HARQ ACK feedback. In some cases, transmitting the NAK may include transmitting the NAK during a subframe in which the HARQ ACK feedback for the at least one of the one or more first data receive messages is scheduled to be transmitted. Additionally or alternatively, HARQ feedback component 1050 may transmit HARQ feedback to a base station that transmitted the at least one of the one or more first data receive messages.

Exclusion window component 1055 may determine that the first uplink grant is within an exclusion window of the second uplink grant, where transmitting the at least the portion of the UCI in the first data transmit message without including the first data in the first data transmit message is based on the first uplink grant being within the exclusion window.

Encoded bits determination component 1060 may determine that a number of encoded RI bits in the UCI satisfies an encoded RI threshold or determine that a number of encoded CQI/PMI bits in the UCI satisfies an encoded CQI/PMI threshold. Accordingly, encoded bits determination component 1060 may include HARQ data, RI, and CQI/PMI in the at least the portion of the UCI to be transmitted in the first data transmit message. Alternatively, encoded bits determination component 1060 may determine that a number of encoded RI bits in the UCI does not satisfy an encoded RI threshold or that a number of encoded CQI/PMI bits in the UCI does not satisfy an encoded CQI/PMI threshold. As such, encoded bits determination component 1060 may include only HARQ data in the at least the portion of the UCI to be transmitted in the first data transmit message.

Figure 11:
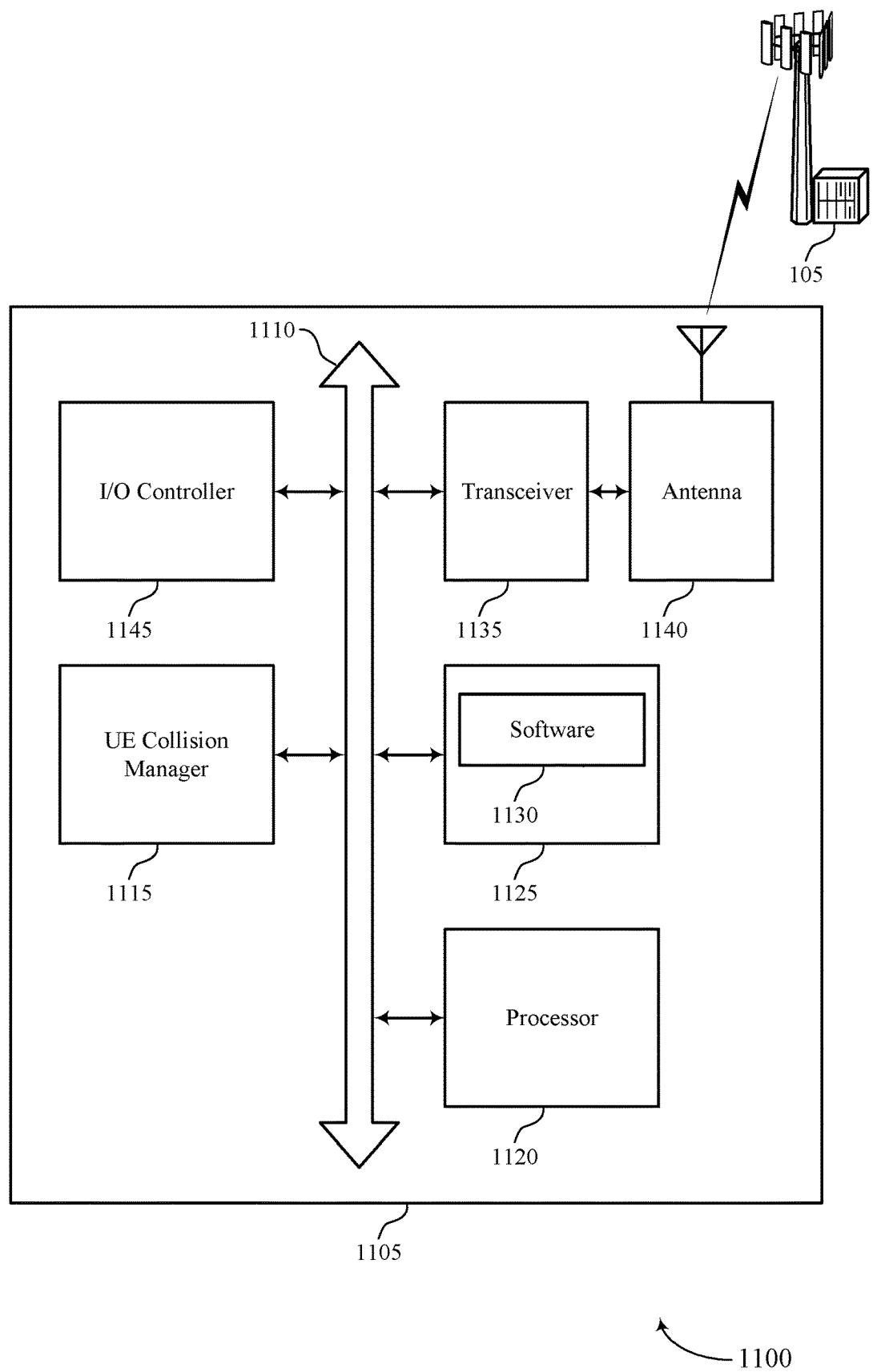
FIG. 11 illustrates a block diagram of a system including a UE that supports UCI reporting in accordance with aspects of the present disclosure.

FIG. 11 shows a diagram of a system 1100 including a device 1105 that supports UCI reporting in accordance with aspects of the present disclosure. Device 1105 may be an example of or include the components of wireless device 805, wireless device 905, or a UE 115 as described above, e.g., with reference to FIGS. 8 and 9. Device 1105 may include components for bi-directional voice and data communications including components for transmitting and receiving communications, including UE collision manager 1115, processor 1120, memory 1125, software 1130, transceiver 1135, antenna 1140, and I/O controller 1145. These components may be in electronic communication via one or more buses (e.g., bus 1110). Device 1105 may communicate wirelessly with one or more base stations 105.

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting UCI reporting in case of TTI and sTTI collision in an exclusion window).

Memory 1125 may include random-access memory (RAM) and read-only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware or software operation such as the interaction with peripheral components or devices.

Software 1130 may include code to implement aspects of the present disclosure, including code to support UCI reporting in case of TTI and sTTI collision in an exclusion window. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system. In other cases, I/O controller 1145 may represent or interact with a modem, a keyboard, a mouse, a touchscreen, or a similar device. In some cases, I/O controller 1145 may be implemented as part of a processor. In some cases, a user may interact with device 1105 via I/O controller 1145 or via hardware components controlled by I/O controller 1145.

Figure 12:
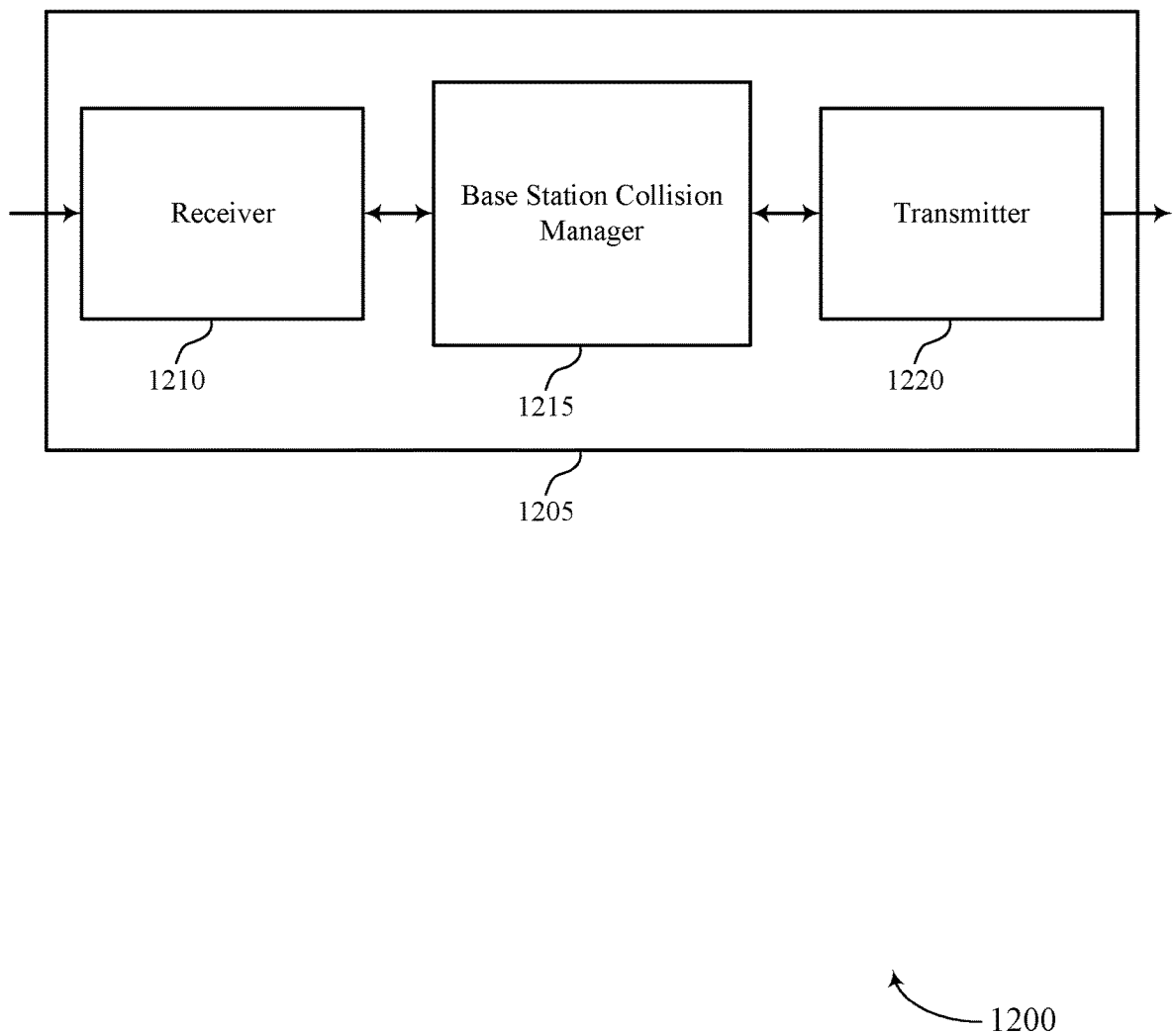
FIGS. 12 through 14 show block diagrams of a device that supports UCI reporting in accordance with aspects of the present disclosure.

FIG. 12 shows a block diagram 1200 of a wireless device 1205 that supports UCI reporting in accordance with aspects of the present disclosure. Wireless device 1205 may be an example of aspects of a base station 105 as described herein. Wireless device 1205 may include receiver 1210, base station collision manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to UCI reporting, etc.). Information may be passed on to other components of the device. The receiver 1210 may be an example of aspects of the transceiver 1535 described with reference to FIG. 15. The receiver 1210 may utilize a single antenna or a set of antennas.

Base station collision manager 1215 may be an example of aspects of the base station collision manager 1515 described with reference to FIG. 15.

Base station collision manager 1215 and/or at least some of its various sub-components may be implemented in hardware, software executed by a processor, firmware, or any combination thereof. If implemented in software executed by a processor, the functions of the base station collision manager 1215 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station collision manager 1215 and/or at least some of its various sub-components may be physically located at various positions, including being distributed such that portions of functions are implemented at different physical locations by one or more physical devices. In some examples, base station collision manager 1215 and/or at least some of its various sub-components may be a separate and distinct component in accordance with various aspects of the present disclosure. In other examples, base station collision manager 1215 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station collision manager 1215 may transmit, to a UE, one or more first data downlink messages, each of the one or more first data downlink messages having a first feedback interval. Base station collision manager 1215 may also transmit, to the UE, a second data downlink message having a second feedback interval, where the second feedback interval is shorter than the first feedback interval. Base station collision manager 1215 may transmit the second data downlink message such that the one or more first data downlink messages are within an exclusion window of the second data downlink message and such that processing, by the UE, of at least one of the one or more first data downlink messages collides with processing, by the UE, of the second data downlink message. Consequently, base station collision manager 1215 may receive HARQ feedback for each of the one or more first data downlink messages in the exclusion window despite a collision.

Additionally or alternatively, base station collision manager 1215 may transmit a first uplink grant scheduling transmission, by a UE, of first data in a first data uplink message after a first response interval. Base station collision manager 1215 may also transmit, to the UE, a second uplink grant scheduling transmission of second data in a second data uplink message after a second response interval, where the second response interval is shorter than the first response interval. Base station collision manager 1215 may then receive the first data uplink message with at least a portion of UCI but without the first data.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may utilize a single antenna or a set of antennas.

Figure 13:
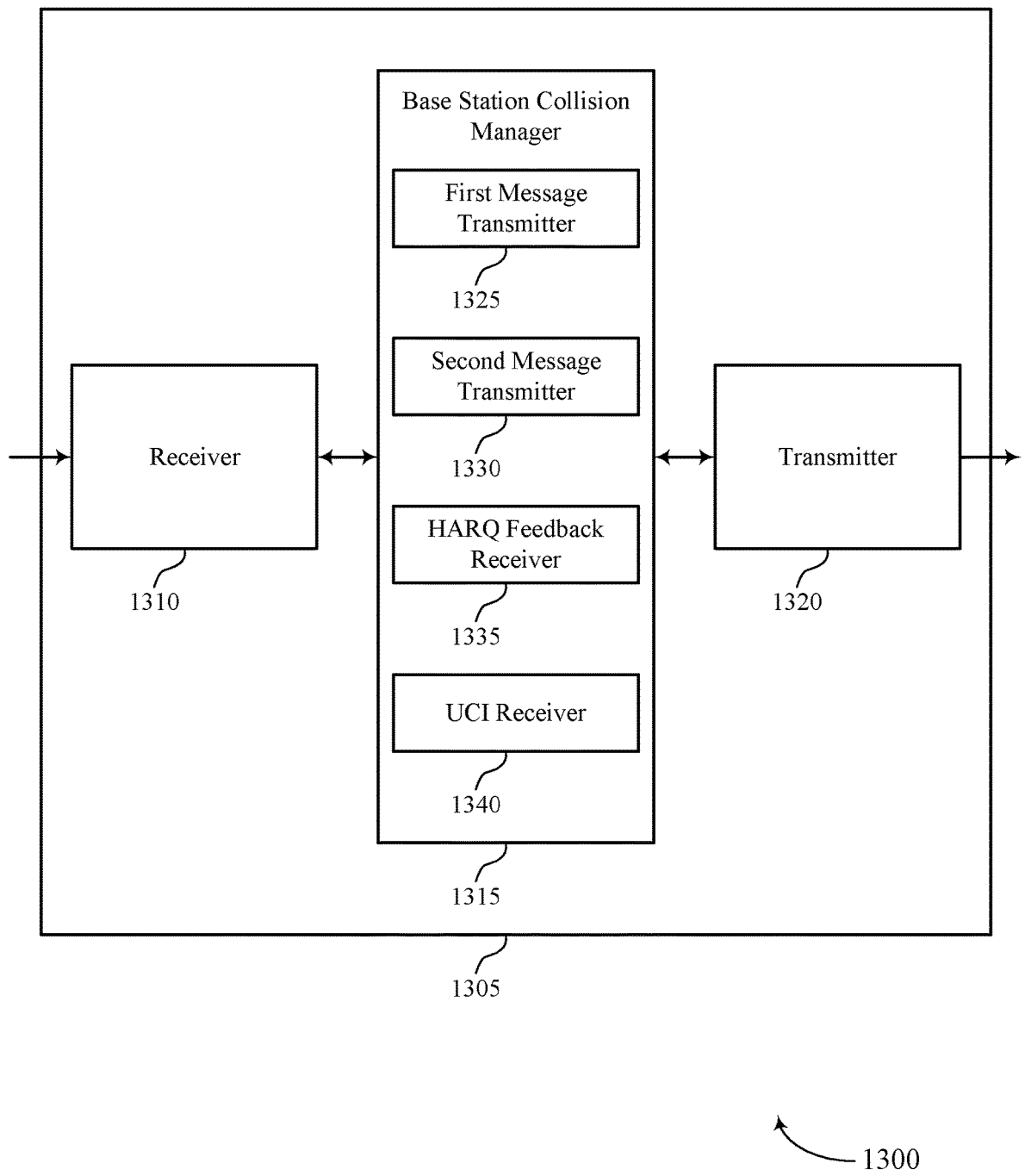

FIG. 13 shows a block diagram 1300 of a wireless device 1305 that supports UCI reporting in accordance with aspects of the present disclosure. Wireless device 1305 may be an example of aspects of a wireless device 1205 or a base station 105 as described with reference to FIG. 12. Wireless device 1305 may include receiver 1310, base station collision manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to UCI reporting, etc.). Information may be passed on to other components of the device. The receiver 1310 may be an example of aspects of the transceiver 1535 described with reference to FIG. 15. The receiver 1310 may utilize a single antenna or a set of antennas.

Base station collision manager 1315 may be an example of aspects of the base station collision manager 1515 described with reference to FIG. 15.

Base station collision manager 1315 may also include first message transmitter 1325, second message transmitter 1330, HARQ feedback receiver 1335, and UCI receiver 1340.

First message transmitter 1325 may transmit, to a UE, one or more first data downlink messages, each of the one or more first data downlink messages having a first feedback interval. Additionally or alternatively, first message transmitter 1325 may transmit a first uplink grant scheduling transmission, by a UE, of first data in a first data uplink message after a first response interval.

Second message transmitter 1330 may transmit, to the UE, a second data downlink message having a second feedback interval, where the second feedback interval is shorter than the first feedback interval. Second message transmitter 1330 may transmit the second data downlink message such that the one or more first data downlink messages are within an exclusion window of the second data downlink message and such that processing, by the UE, of at least one of the one or more first data downlink messages collides with processing, by the UE, of the second data downlink message. Additionally or alternatively, second message transmitter 1330 may transmit, to the UE, a second uplink grant scheduling transmission of second data in a second data uplink message after a second response interval, where the second response interval is shorter than the first response interval. In some cases, the second data message (e.g., second data downlink message or second data uplink message) may have a higher priority than any of the one or more first data messages (e.g., one or more first data downlink messages or first data uplink message). In some cases, transmitting the second uplink grant may include transmitting the second uplink grant such that the first uplink grant is within an exclusion window of the second uplink grant.

HARQ feedback receiver 1335 may receive HARQ feedback for each of the one or more first data downlink messages in the exclusion window despite a collision. In some cases, receiving the HARQ feedback may include receiving a NAK for the at least one of the one or more first data downlink messages that collided with processing of the second data downlink message, where the at least one of the one or more first data downlink messages is not processed by the UE based on the collision.

UCI receiver 1340 may receive the first data uplink message with at least a portion of UCI but without the first data. In some cases, receiving the first data uplink message may include receiving the first data uplink message in a format that is based on inclusion of both the first data and the UCI in the first data uplink message. Additionally or alternatively, receiving the first data uplink message may include receiving dummy data in place of the first data in the first data uplink message. In some cases, the dummy data may be a set of random bits (e.g., modulation symbols) or a fixed pre-defined sequence of bits that indicates an absence of encoded first data. In some cases, the at least the portion of the UCI received in the first data uplink message may be limited to HARQ data.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may utilize a single antenna or a set of antennas.

Figure 14:
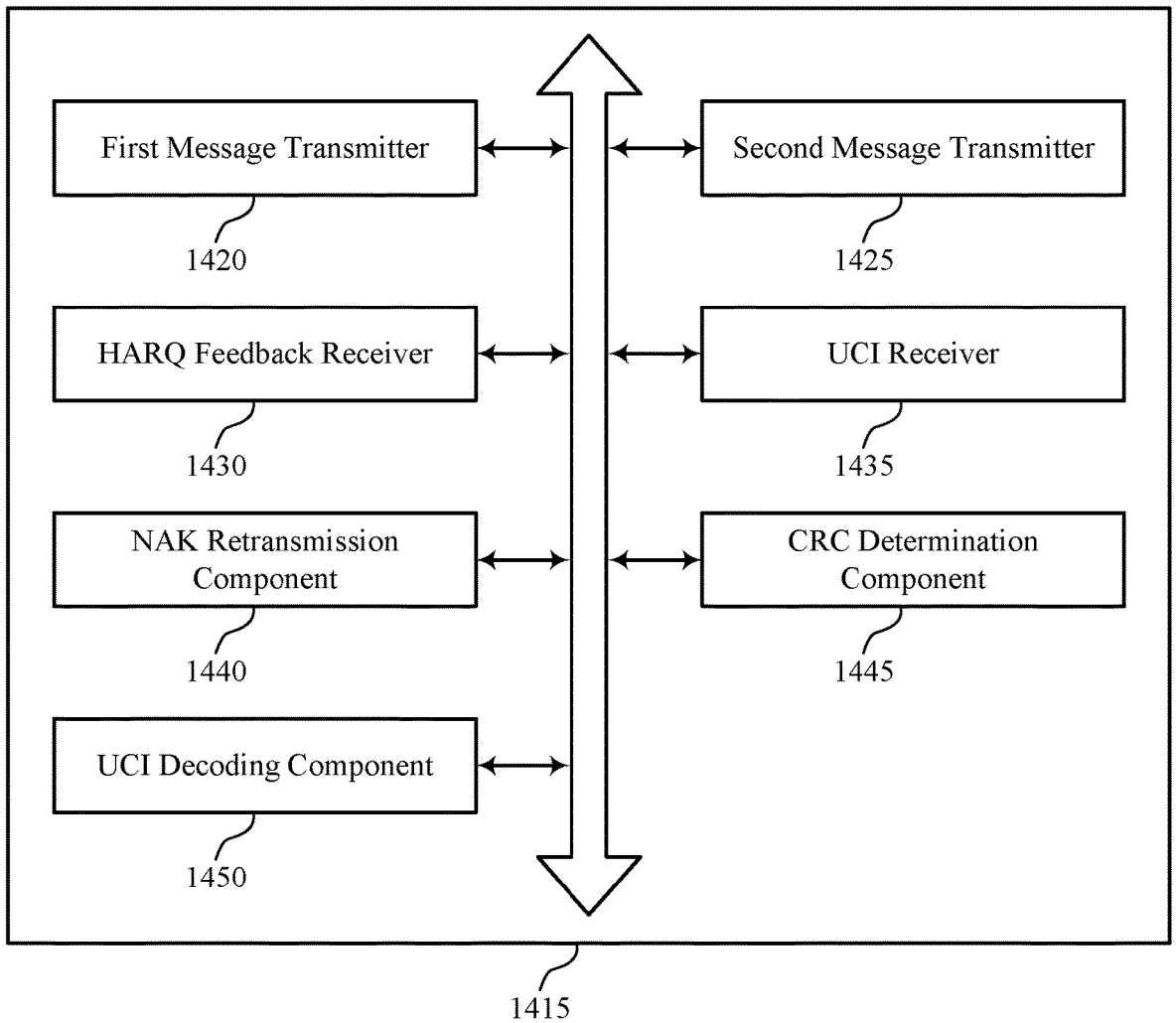

FIG. 14 shows a block diagram 1400 of a base station collision manager 1415 that supports UCI reporting in accordance with aspects of the present disclosure. The base station collision manager 1415 may be an example of aspects of a base station collision manager 1515 described with reference to FIGS. 12, 13, and 15. The base station collision manager 1415 may include first message transmitter 1420, second message transmitter 1425, HARQ feedback receiver 1430, UCI receiver 1435, NAK retransmission component 1440, CRC determination component 1445, and UCI decoding component 1450. Each of these modules may communicate, directly or indirectly, with one another (e.g., via one or more buses).

First message transmitter 1420 may transmit, to a UE, one or more first data downlink messages, each of the one or more first data downlink messages having a first feedback interval. Additionally or alternatively, first message transmitter 1420 may transmit a first uplink grant scheduling transmission, by a UE, of first data in a first data uplink message after a first response interval.

Second message transmitter 1425 may transmit, to the UE, a second data downlink message having a second feedback interval, where the second feedback interval is shorter than the first feedback interval. Second message transmitter 1425 may transmit the second data downlink message such that the one or more first data downlink messages are within an exclusion window of the second data downlink message and such that processing, by the UE, of at least one of the one or more first data downlink messages collides with processing, by the UE, of the second data downlink message. Additionally or alternatively, second message transmitter 1425 may transmit, to the UE, a second uplink grant scheduling transmission of second data in a second data uplink message after a second response interval, where the second response interval is shorter than the first response interval. In some cases, the second data message (e.g., second data downlink message or second data uplink message) may have a higher priority than any of the one or more first data messages (e.g., one or more first data downlink messages or first data uplink message). In some cases, transmitting the second uplink grant may include transmitting the second uplink grant such that the first uplink grant is within an exclusion window of the second uplink grant.

HARQ feedback receiver 1430 may receive HARQ feedback for each of the one or more first data downlink messages in the exclusion window despite a collision. In some cases, receiving the HARQ feedback may include receiving a NAK for the at least one of the one or more first data downlink messages that collided with processing of the second data downlink message, where the at least one of the one or more first data downlink messages is not processed by the UE based on the collision.

UCI receiver 1435 may receive the first data uplink message with at least a portion of UCI but without the first data. In some cases, receiving the first data uplink message may include receiving the first data uplink message in a format that is based on inclusion of both the first data and the UCI in the first data uplink message. Additionally or alternatively, receiving the first data uplink message may include receiving dummy data in place of the first data in the first data uplink message. In some cases, the dummy data may be a set of random bits (e.g., modulation symbols) or a fixed pre-defined sequence of bits that indicates an absence of encoded first data. In some cases, the at least the portion of the UCI received in the first data uplink message may be limited to HARQ data.

NAK retransmission component 1440 may retransmit the at least one of the one or more first data downlink messages based on receipt of the NAK.

CRC determination component 1445 may determine that the first data uplink message includes a CRC value. Alternatively, CRC determination component 1445 may determine that the first data uplink message does not include a CRC value.

UCI decoding component 1450 may attempt to decode RI data, CQI/PMI data, and HARQ data in the at least the portion of the UCI of the first data uplink message based on a presence of the CRC value. Alternatively, UCI decoding component 1450 may attempt to decode only HARQ data in the at least the portion of the UCI of the first data uplink message based on an absence of the CRC value.

Figure 15:
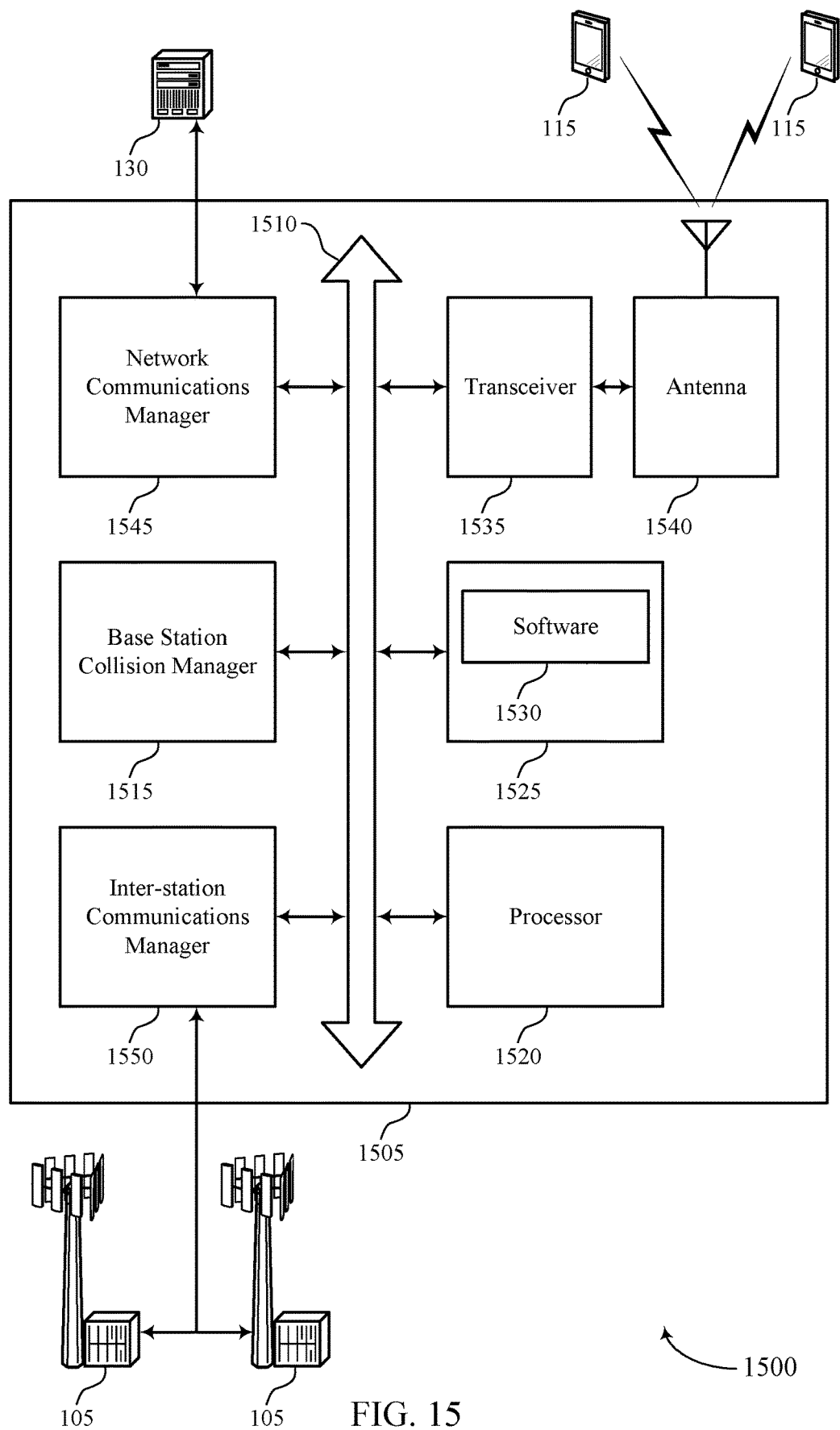
FIG. 15 illustrates a block diagram of a system including a base station that supports UCI reporting in accordance with aspects of the present disclosure.

FIG. 15 shows a diagram of a system 1500 including a device 1505 that supports UCI reporting in accordance with aspects of the present disclosure. Device 1505 may be an example of or include the components of base station 105 as described above, e.g., with reference to FIG. 1. Device 1505 may include components for bi-directional voice and data communications including components for transmitting and receiving communications, such as base station collision manager 1515, processor 1520, memory 1525, software 1530, transceiver 1535, antenna 1540, network communications manager 1545, and inter-station communications manager 1550. These components may be in electronic communication via one or more buses (e.g., bus 1510). Device 1505 may communicate wirelessly with one or more UEs 115.

Processor 1520 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting UCI reporting in case of TTI and sTTI collision in an exclusion window).

Memory 1525 may include RAM and ROM. The memory 1525 may store computer-readable, computer-executable software 1530 including instructions that, when executed, cause the processor to perform various functions described herein. In some cases, the memory 1525 may contain, among other things, a BIOS which may control basic hardware or software operation such as the interaction with peripheral components or devices.

Software 1530 may include code to implement aspects of the present disclosure, including code to support UCI reporting in case of TTI and sTTI collision in an exclusion window. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

In some cases, the wireless device may include a single antenna 1540. However, in some cases the device may have more than one antenna 1540, which may be capable of concurrently transmitting or receiving multiple wireless transmissions.

Network communications manager 1545 may manage communications with the core network (e.g., via one or more wired backhaul links). For example, the network communications manager 1545 may manage the transfer of data communications for client devices, such as one or more UEs 115.

Inter-station communications manager 1550 may manage communications with other base stations 105, and may include a controller or scheduler for controlling communications with UEs 115 in cooperation with other base stations 105. For example, the inter-station communications manager 1550 may coordinate scheduling for transmissions to UEs 115 for various interference mitigation techniques such as beamforming or joint transmission. In some examples, inter-station communications manager 1550 may provide an X2 interface within an LTE/LTE-A wireless communication network technology to provide communication between base stations 105.

Figure 16:
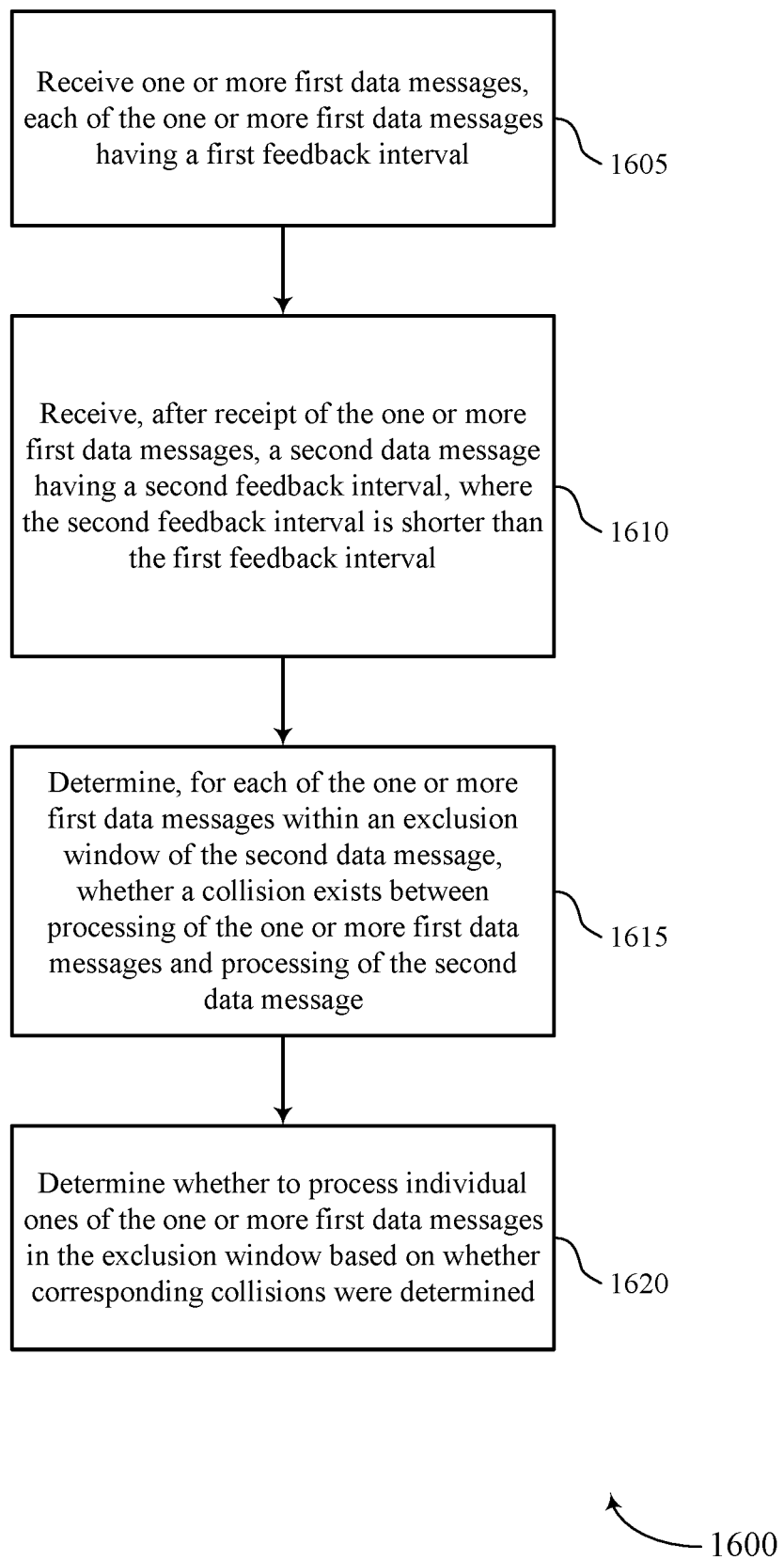
FIGS. 16 through 19 illustrate methods for UCI reporting in accordance with aspects of the present disclosure.

FIG. 16 shows a flowchart illustrating a method 1600 for UCI reporting in accordance with aspects of the present disclosure. The operations of method 1600 may be implemented by a UE 115 or its components as described herein. For example, the operations of method 1600 may be performed by a UE collision manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At 1605 the UE 115 may receive one or more first data messages, each of the one or more first data messages having a first feedback interval. The operations of 1605 may be performed according to the methods described herein. In certain examples, aspects of the operations of 1605 may be performed by a first message receiver as described with reference to FIGS. 8 through 11.

At 1610 the UE 115 may receive, after receipt of the one or more first data messages, a second data message having a second feedback interval, where the second feedback interval is shorter than the first feedback interval. The operations of 1610 may be performed according to the methods described herein. In certain examples, aspects of the operations of 1610 may be performed by a second message receiver as described with reference to FIGS. 8 through 11.

At 1615 the UE 115 may determine, for each of the one or more first data messages within an exclusion window of the second data message, whether a collision exists between processing of the one or more first data messages and processing of the second data message. The operations of 1615 may be performed according to the methods described herein. In certain examples, aspects of the operations of 1615 may be performed by a collision existence component as described with reference to FIGS. 8 through 11.

At 1620 the UE 115 may determine whether to process individual ones of the one or more first data messages in the exclusion window based on whether corresponding collisions were determined. The operations of 1620 may be performed according to the methods described herein. In certain examples, aspects of the operations of 1620 may be performed by a process determination component as described with reference to FIGS. 8 through 11.

Figure 17:
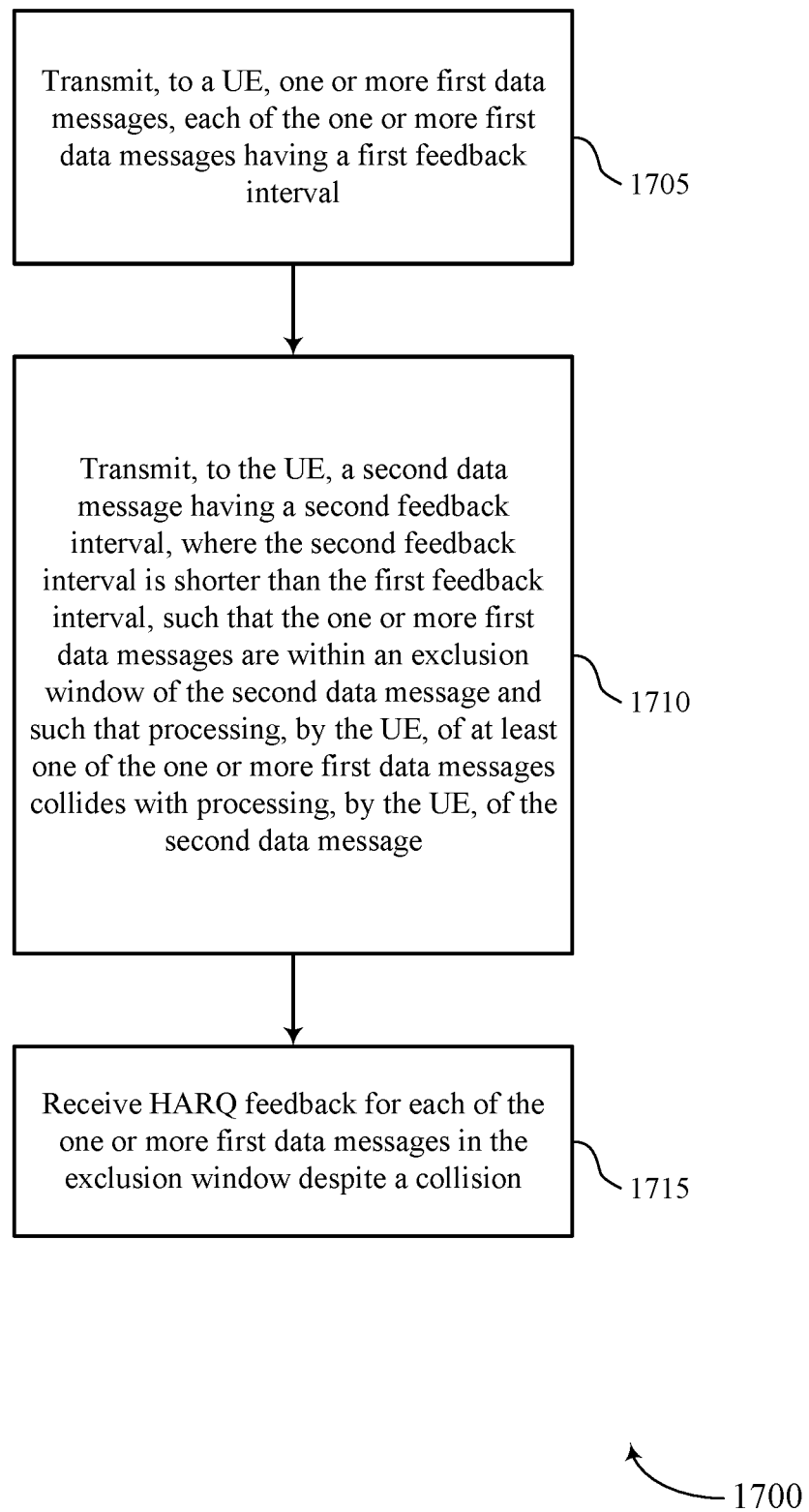

FIG. 17 shows a flowchart illustrating a method 1700 for UCI reporting in accordance with aspects of the present disclosure. The operations of method 1700 may be implemented by a base station 105 or its components as described herein. For example, the operations of method 1700 may be performed by a base station collision manager as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At 1705 the base station 105 may transmit, to a UE, one or more first data messages, each of the one or more first data messages having a first feedback interval. The operations of 1705 may be performed according to the methods described herein. In certain examples, aspects of the operations of 1705 may be performed by a first message transmitter as described with reference to FIGS. 12 through 15.

At 1710 the base station 105 may transmit, to the UE, a second data message having a second feedback interval, where the second feedback interval is shorter than the first feedback interval. The base station 105 may transmit the second data message such that the one or more first data messages are within an exclusion window of the second data message and such that processing, by the UE, of at least one of the one or more first data messages collides with processing, by the UE, of the second data message. The operations of 1710 may be performed according to the methods described herein. In certain examples, aspects of the operations of 1710 may be performed by a second message transmitter as described with reference to FIGS. 12 through 15.

At 1715 the base station 105 may receive HARQ feedback for each of the one or more first data messages in the exclusion window despite a collision. The operations of 1715 may be performed according to the methods described herein. In certain examples, aspects of the operations of 1715 may be performed by a HARQ feedback receiver as described with reference to FIGS. 12 through 15.

Figure 18:
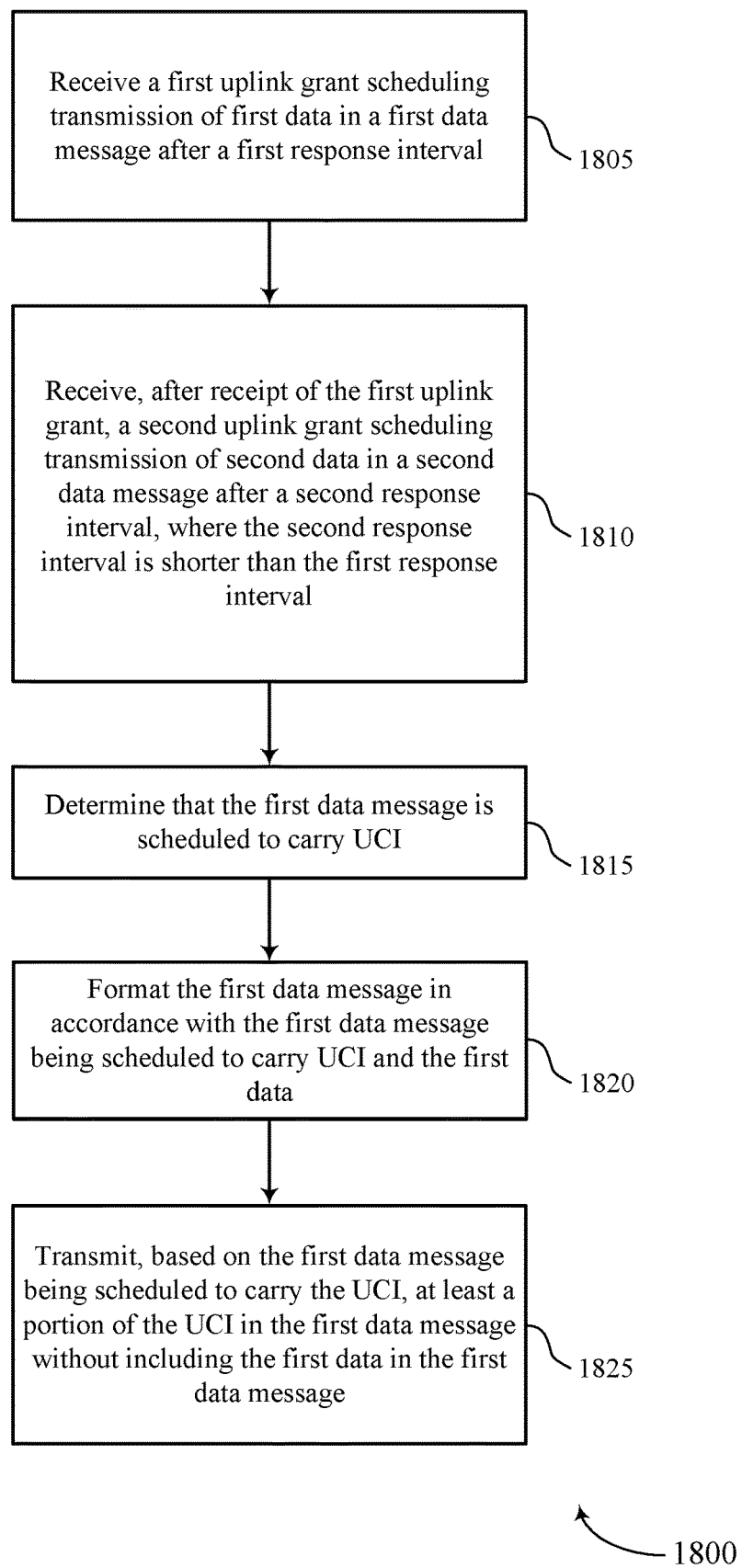

FIG. 18 shows a flowchart illustrating a method 1800 for UCI reporting in accordance with aspects of the present disclosure. The operations of method 1800 may be implemented by a UE 115 or its components as described herein. For example, the operations of method 1800 may be performed by a UE collision manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At 1805 the UE 115 may receive a first uplink grant scheduling transmission of first data in a first data message after a first response interval. The operations of 1805 may be performed according to the methods described herein. In certain examples, aspects of the operations of 1805 may be performed by a first message receiver as described with reference to FIGS. 8 through 11.

At 1810 the UE 115 may receive, after receipt of the first uplink grant, a second uplink grant scheduling transmission of second data in a second data message after a second response interval, where the second response interval is shorter than the first response interval. The operations of 1810 may be performed according to the methods described herein. In certain examples, aspects of the operations of 1810 may be performed by a second message receiver as described with reference to FIGS. 8 through 11.

At 1815 the UE 115 may determine that the first data message is scheduled to carry UCI. The operations of 1815 may be performed according to the methods described herein. In certain examples, aspects of the operations of 1815 may be performed by a UCI determination component as described with reference to FIGS. 8 through 11.

At 1820 the UE 115 may format the first data message in accordance with the first data message being scheduled to carry UCI and the first data. The operations of 1820 may be performed according to the methods described herein. In certain examples, aspects of the operations of 1820 may be performed by a UCI determination component as described with reference to FIGS. 8 through 11.

At 1825 the UE 115 may transmit, based on the first data message being scheduled to carry the UCI, at least a portion of the UCI in the first data message without including the first data in the first data message. The operations of 1825 may be performed according to the methods described herein. In certain examples, aspects of the operations of 1825 may be performed by a UCI transmitter as described with reference to FIGS. 8 through 11.

Figure 19:
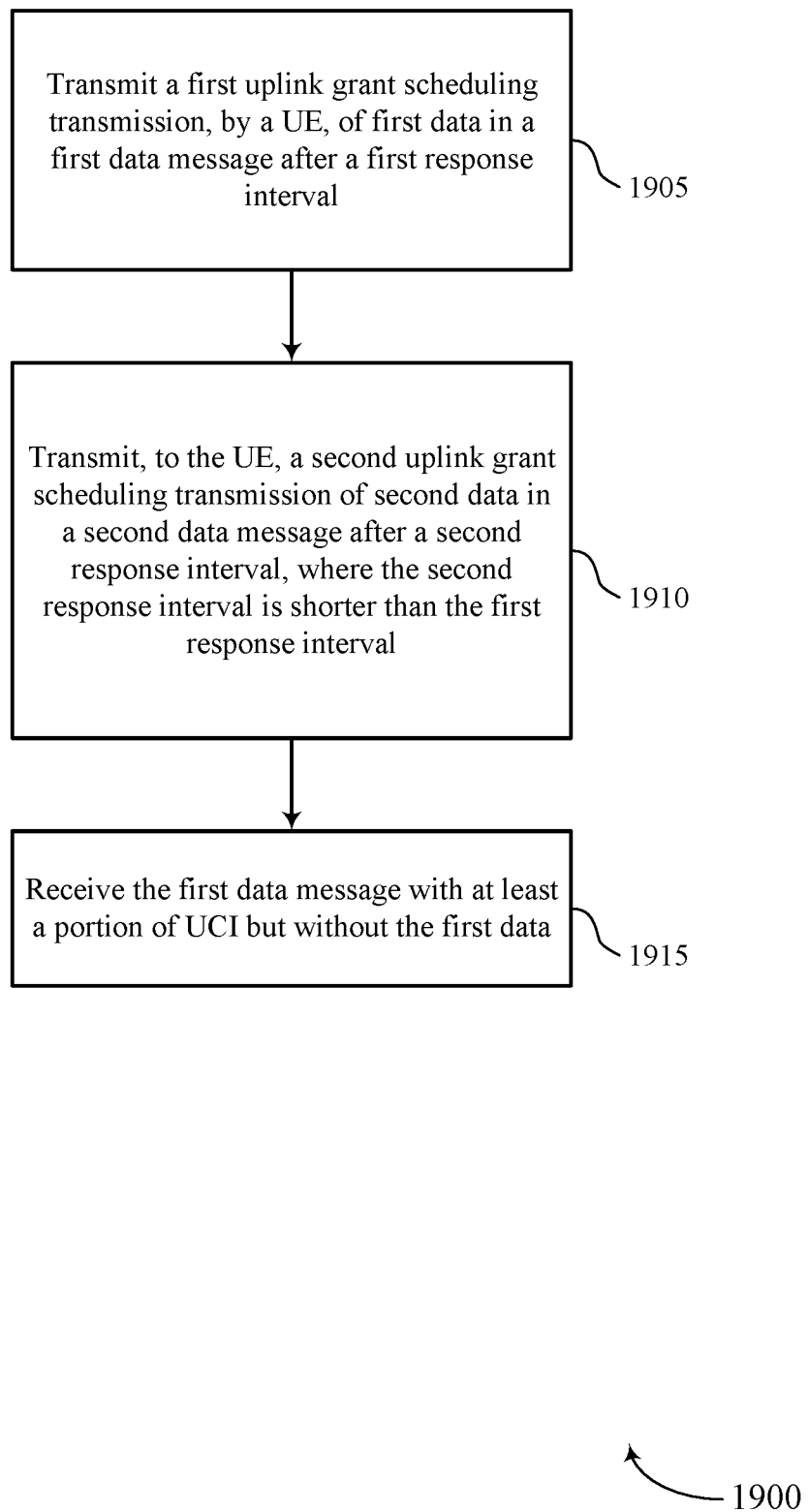

FIG. 19 shows a flowchart illustrating a method 1900 for UCI reporting in accordance with aspects of the present disclosure. The operations of method 1900 may be implemented by a base station 105 or its components as described herein. For example, the operations of method 1900 may be performed by a base station collision manager as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At 1905 the base station 105 may transmit a first uplink grant scheduling transmission, by a UE, of first data in a first data message after a first response interval. The operations of 1905 may be performed according to the methods described herein. In certain examples, aspects of the operations of 1905 may be performed by a first message transmitter as described with reference to FIGS. 12 through 15.

At 1910 the base station 105 may transmit, to the UE, a second uplink grant scheduling transmission of second data in a second data message after a second response interval, where the second response interval is shorter than the first response interval. The operations of 1910 may be performed according to the methods described herein. In certain examples, aspects of the operations of 1910 may be performed by a second message transmitter as described with reference to FIGS. 12 through 15.

At 1915 the base station 105 may receive the first data message with at least a portion of UCI but without the first data. The operations of 1915 may be performed according to the methods described herein. In certain examples, aspects of the operations of 1915 may be performed by a UCI receiver as described with reference to FIGS. 12 through 15.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
receiving, at a user equipment (UE), one or more first data messages, each of the one or more first data messages having a first feedback interval;
receiving, at the UE and after receipt of the one or more first data messages, a second data message having a second feedback interval, wherein the second feedback interval is shorter than the first feedback interval;
determining, for each of the one or more first data messages within an exclusion window of the second data message, whether a collision exists between processing a decoding of the one or more first data messages and processing a decoding of the second data message, wherein the exclusion window extends from the second data message to a quantity of subframes before the second data message, the quantity of subframes based on a capability of the UE; and
determining whether to process a decoding of individual ones of the one or more first data messages in the exclusion window based at least in part on whether corresponding collisions were determined.

2. The method of claim 1, further comprising:
refraining from processing a decoding of at least one of the one or more first data messages in the exclusion window based at least in part on an existence of a collision with processing of the second data message, wherein the at least one of the one or more first data messages comprises an indication to transmit hybrid access request (HARQ) acknowledgment (ACK) feedback for the corresponding first data message; and
transmitting a negative acknowledgment (NAK) to a base station that transmitted the at least one of the one or more first data messages based at least in part on the indication to transmit the HARQ ACK feedback and the refraining from processing the decoding of the at least one of the one or more first data messages.

3. The method of claim 2, wherein transmitting the NAK comprises:
transmitting the NAK during a subframe in which the HARQ ACK feedback for the at least one of the one or more first data messages is scheduled to be transmitted.

4. The method of claim 1, further comprising:
processing a decoding of at least one of the one or more first data messages in the exclusion window based at least in part on an absence of a collision with processing of the second data message; and
transmitting hybrid automatic repeat request (HARQ) feedback to a base station that transmitted the at least one of the one or more first data messages.

5. The method of claim 1, wherein the second data message has a higher priority than any of the one or more first data messages.

6. The method of claim 1, wherein at least one of the one or more first data messages is received over a different component carrier than the second data message.

7. A method for wireless communication, comprising:
transmitting, to a user equipment (UE), one or more first data messages, each of the one or more first data messages having a first feedback interval;
transmitting, to the UE, a second data message having a second feedback interval such that the one or more first data messages are within an exclusion window of the second data message and such that processing a decoding, by the UE, of at least one of the one or more first data messages collides with processing a decoding, by the UE, of the second data message, wherein the second feedback interval is shorter than the first feedback interval, and wherein the exclusion window extends from the second data message to a quantity of subframes before the second data message, the quantity of subframes based on a capability of the UE; and
receiving hybrid automatic repeat request (HARQ) feedback for each of the one or more first data messages in the exclusion window despite a collision.

8. The method of claim 7, wherein receiving the HARQ feedback comprises:
receiving a negative acknowledgment (NAK) for the at least one of the one or more first data messages that collided with processing the decoding of the second data message, wherein the decoding of at least one of the one or more first data messages is not processed by the UE based at least in part on the collision.

9. The method of claim 8, further comprising:
retransmitting the at least one of the one or more first data messages based at least in part on receipt of the NAK.

10. The method of claim 7, wherein the second data message has a higher priority than any of the one or more first data messages.

11. The method of claim 7, wherein at least one of the one or more first data messages is transmitted over a different component carrier than the second data message.

12. An apparatus for wireless communication, comprising:
a processor;
memory coupled with the processor; and
instructions stored in the memory and executable by the processor to cause the apparatus to:
receive one or more first data messages, each of the one or more first data messages having a first feedback interval;
receive, after receipt of the one or more first data messages, a second data message having a second feedback interval, wherein the second feedback interval is shorter than the first feedback interval;
determine, for each of the one or more first data messages within an exclusion window of the second data message, whether a collision exists between processing a decoding of the one or more first data messages and processing a decoding of the second data message, wherein the exclusion window extends from the second data message to a quantity of subframes before the second data message, the quantity of subframes based on a capability of the apparatus; and
determine whether to process a decoding of individual ones of the one or more first data messages in the exclusion window based at least in part on whether corresponding collisions were determined.

13. The apparatus of claim 12, wherein the instructions are further executable by the processor to cause the apparatus to:
- refrain from processing a decoding of at least one of the one or more first data messages in the exclusion window based at least in part on an existence of a collision with processing a decoding of the second data message, wherein the at least one of the one or more first data messages comprises an indication to transmit hybrid access request (HARQ) acknowledgment (ACK) feedback for the corresponding first data message; and
- transmit a negative acknowledgment (NAK) to a base station that transmitted the at least one of the one or more first data messages based at least in part on the indication to transmit the HARQ ACK feedback and the refrainment from processing the decoding of the at least one of the one or more first data messages.

14. The apparatus of claim 13, wherein the instructions to transmit the NAK are further executable by the processor to cause the apparatus to:
- transmit the NAK during a subframe in which the HARQ ACK feedback for the at least one of the one or more first data messages is scheduled to be transmitted.

15. The apparatus of claim 12, wherein the instructions are further executable by the processor to cause the apparatus to:
- process a decoding of at least one of the one or more first data messages in the exclusion window based at least in part on an absence of a collision with processing of the second data message; and
- transmit hybrid automatic repeat request (HARQ) feedback to a base station that transmitted the at least one of the one or more first data messages.

16. The apparatus of claim 12, wherein the second data message has a higher priority than any of the one or more first data messages.

17. The apparatus of claim 12, wherein at least one of the one or more first data messages is received over a different component carrier than the second data message.

18. An apparatus for wireless communication, comprising:
- a processor;
- memory coupled with the processor; and
- instructions stored in the memory and executable by the processor to cause the apparatus to:
  - transmit, to a user equipment (UE), one or more first data messages, each of the one or more first data messages having a first feedback interval;
  - transmit, to the UE, a second data message having a second feedback interval such that the one or more first data messages are within an exclusion window of the second data message and such that processing a decoding, by the UE, of at least one of the one or more first data messages collides with processing a decoding, by the UE, of the second data message, wherein the second feedback interval is shorter than the first feedback interval, and wherein the exclusion window extends from the second data message to a quantity of subframes before the second data message, the quantity of subframes based on a capability of the UE; and
  - receive hybrid automatic repeat request (HARQ) feedback for each of the one or more first data messages in the exclusion window despite a collision.

19. The apparatus of claim 18, wherein the instructions to receive the HARQ feedback are further executable by the processor to cause the apparatus to:
- receive a negative acknowledgment (NAK) for the at least one of the one or more first data messages that collided with processing the decoding of the second data message, wherein the decoding of at least one of the one or more first data messages is not processed by the UE based at least in part on the collision.

20. The apparatus of claim 19, wherein the instructions are further executable by the processor to cause the apparatus to:
- retransmit the at least one of the one or more first data messages based at least in part on receipt of the NAK.

21. The apparatus of claim 18, wherein the second data message has a higher priority than any of the one or more first data messages.

22. The apparatus of claim 18, wherein at least one of the one or more first data messages is transmitted over a different component carrier than the second data message.

* * * * *